United States Patent [19]
Bernzott et al.

[11] Patent Number: 5,131,053
[45] Date of Patent: Jul. 14, 1992

[54] OPTICAL CHARACTER RECOGNITION METHOD AND APPARATUS

[75] Inventors: Philip Bernzott; John Dilworth; David George, all of Oakland; Bryan Higgins; Jeremy Knight, both of Berkeley, all of Calif.

[73] Assignee: Caere Corporation, Los Gatos, Calif.

[21] Appl. No.: 230,847

[22] Filed: Aug. 10, 1988

[51] Int. Cl.$^5$ .......................... G06K 9/34; G06K 9/48; G06K 9/72; G06K 9/68
[52] U.S. Cl. .......................................... 382/9; 382/22; 382/38; 382/40
[58] Field of Search ........................ 382/38, 22, 40, 9; 358/462

[56] References Cited

U.S. PATENT DOCUMENTS

| | | | |
|---|---|---|---|
| 3,613,081 | 10/1971 | Morimoto | 340/146.3 |
| 3,641,495 | 2/1972 | Kiji | 340/146.3 |
| 3,930,231 | 12/1975 | Henrichon, Jr. et al. | 340/146.3 |
| 4,177,448 | 12/1979 | Brayton | 430/146.3 |
| 4,491,965 | 1/1985 | Yoshimura | 382/57 |
| 4,589,142 | 5/1986 | Bednar | 382/9 |
| 4,611,346 | 9/1986 | Bednar et al. | 382/37 |
| 4,741,046 | 4/1988 | Matsunawa et al. | 382/9 |
| 4,742,556 | 5/1988 | Davis, Jr. et al. | 382/51 |
| 4,893,188 | 1/1990 | Murakami et al. | 358/456 |

FOREIGN PATENT DOCUMENTS

| | | |
|---|---|---|
| 0138079 | 9/1984 | European Pat. Off. |
| 0144202 | 11/1984 | European Pat. Off. |
| 86/00445 | 1/1986 | PCT Int'l Appl. |
| 1403816 | 10/1973 | United Kingdom |
| 2182796 | 10/1986 | United Kingdom |

Primary Examiner—David K. Moore
Assistant Examiner—Michael Cammarata
Attorney, Agent, or Firm—Blakely, Sokoloff, Taylor & Zafman

[57] ABSTRACT

A system for recognition of characters on a medium. The system includes a scanner for scanning a medium such as a page of printed text and graphics and producing a bit-mapped representation of the page. The bit-mapped representation of the page is then stored in a memory means such as the memory of a computer system. A processor processes the bit-mapped image to produce an output comprising coded character representation of the text on the page. The present invention discloses parsing a page to allow for production of the output characters in a logical sequence, a combination of feature detection methods and template matching methods for recognition of characters and a number of methods for feature detection such as use of statistical data and polygon fitting.

15 Claims, 21 Drawing Sheets

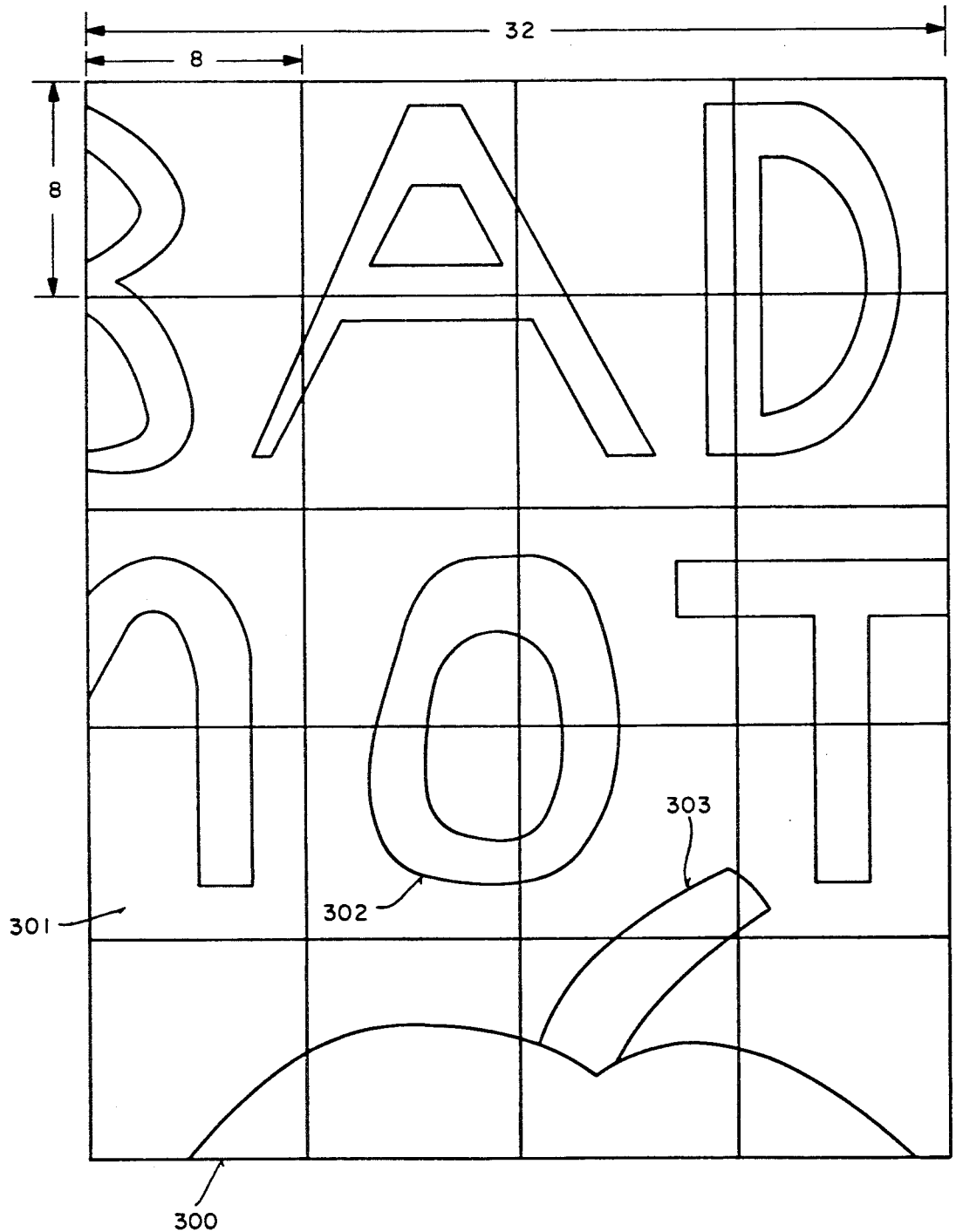
FIG_3A

FIG_3B
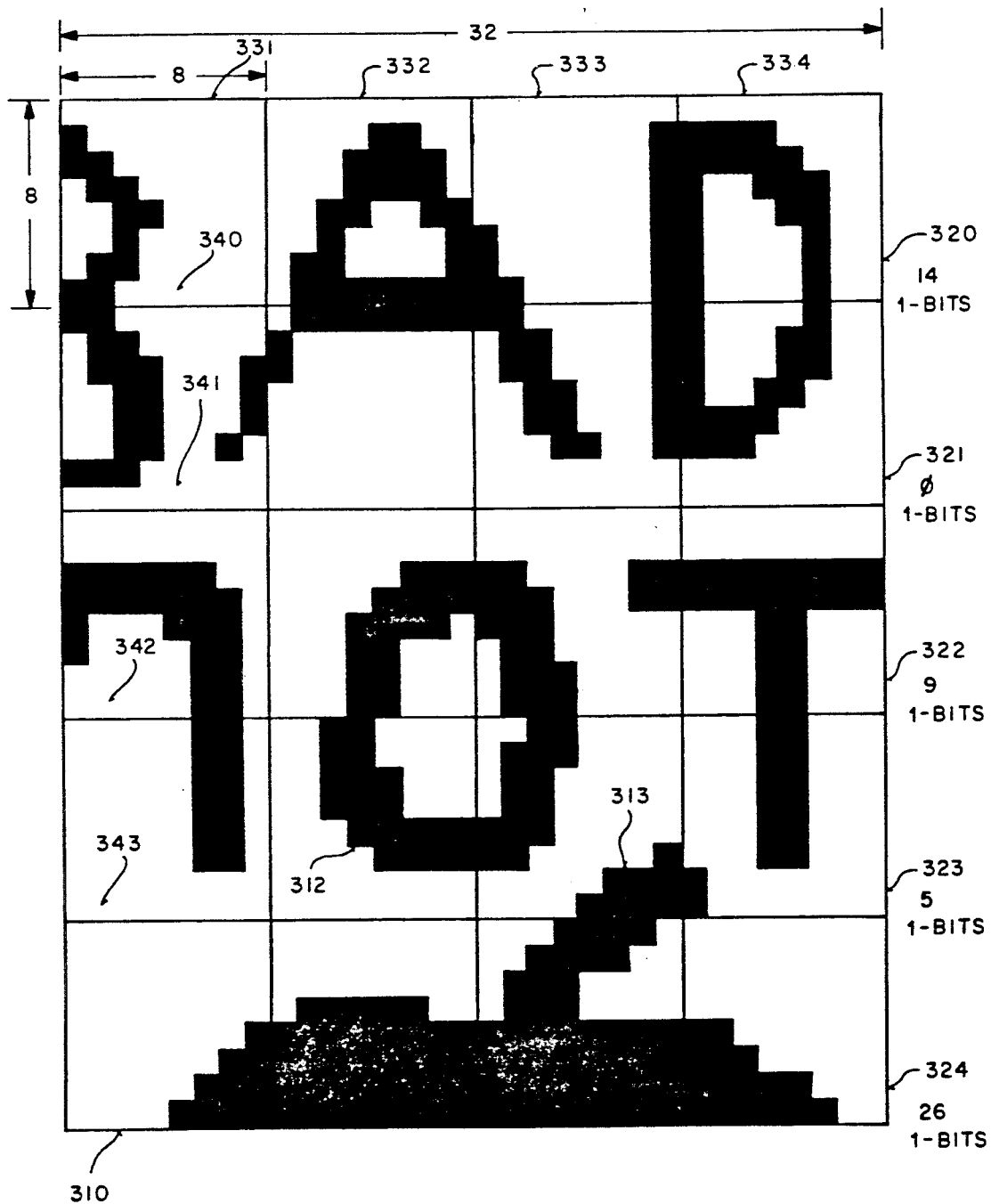

```
        xxxxxxxx
      xxxxxxxxxxxx
     xxxxxxxxxxxxxx
    xxxxxx    xxxxxx
   xxxxx x      xxxxx
   xxxx          xxxx
  xxxx            xxxx
  xxxx            xxxx
  xxxx            xxxx
  xxxx            xxxx
  xxxxx           xxxx
  xxxxx          xxxxx
  xxxxxxxxxxxxx xxxxxxxxxx
  xxxxxxxxxxxxxxxxxxxxxxxx
  xx xxxxxxxxxxxxxxxxxx xxx
  xxxxxxxxxxxxxxxxxxxxxx
  xxx x
  xxxx
  xxxx
  xxxx            xx
  xxxx            xxx
  xxxx            xxxx
   xxxx           xxxx
   xxxxx          xxxxx
    xxxxx        xxxxx
    xxxxxxx      xxxxx
     xxxxxxxx  xxxxxxxx
      xxxxxxxxxxxxxxx
        xxx xxxxxxxx xxx
          xxxxxxxx xx
```

```
  -----    xxxxxxxx    ------
   ---   xxx++++++xxx    -----
   --  xxx++xxxxxx+++xx   ----
   -   xx++xxx    xxx++xx   ---
   -  xx++xx   --   xx++xx  ---
      x++xx   ------  xx++x  --
     xx+xx  --------  xx+xx  --
     x++x  ----------  x++x  --
     x++x ------------ x++x  --
    xx++x ------------ x++x  -
    x+++x              x++xx  -
    x+++xxxxxxxxxxxxxxxx++x  -
    x+++++++++++++++++++++X  -
    x+++++++++++++++++++++xx  -
    x++xxxxxxxxxxxxxxxxxx    -
    x++x                     --
    x++x --------------------
    x++x ---------------    --
    x++x -------------- xx  --
    x++x -----------  xxx  --
    xx+xx -----------  xx+x  --
    x++x ----------  x++x  --
    xx+xx --------  xx++x  --
    x++xx  -----   xx++xx  --
   - xx++xxx       xx++xx  --
   -  xx+++xxx   xxxxx++xx  ---
   --  xx++++xxx+++++xx   ----
   ---   xxx+++++++xxx    -----
   ----    xxxxxxxx     ------
   ------              -------
```

OPTICAL CHARACTER RECOGNITION METHOD AND APPARATUS

BACKGROUND OF THE INVENTION

1. Field of the Invention

The present invention relates to the field of optical character recognition systems and, more specifically, to a method and apparatus for performing optical character recognition of printed text.

2. Prior Art

A number of optical character recognition (OCR) systems are known in the art. Typically, such systems comprise apparatus for scanning a page of printed text and performing a character recognition process on a bit-mapped image of the text. The characters may then be stored in a file on a computer system for processing by a word processor or the like.

Some known OCR systems comprise a hand held scanner for scanning a page. In such systems, the individual performing the scan, sweeps the hand held device over printed text on the page and will normally avoid scanning of graphics or non-text portions of the page. Normally, the page is scanned in the order in which it is normally read (i.e. the scan is performed down columns, scanning across columns from left to right).

Other known systems comprise a ruler apparatus which may be utilized for measuring or indicating portions of the text which are to be processed by the OCR system. Some of such systems are capable of discriminating graphic portions of the indicated page areas from text portions. However, such a system still requires manual intervention to mark off text in the order it is normally read and to mark off graphics portions.

Other systems utilize a registration mark to indicate the beginning of columns of text. These systems still require manual intervention to add registration marks.

Therefore, as one object of the present invention, it is desired to develop an optical character recognition method and apparatus which allows for scanning of a page of text without requiring manual intervention to mark off columns or otherwise indicate the normal order in which the text will be read. Further, it is an object of the present invention to develop an optical character recognition system which allows for a page of mixed text and non-text images to be scanned and for the system to recognize and distinguish between text and non-text for purposes of processing.

Known optical character recognition systems may be generally divided into two categories. Optical character recognition systems in the first category recognize either a single font or a limited number of fonts and their input is usually restricted to monospaced type of a specific point size. Optical character recognition systems in the second category are typically termed omnifont systems. Such systems are capable of recognizing a large number of typefaces in a wide range of point sizes, either monospaced or proportionally spaced. In general, optical character recognition systems which recognize a large number of typefaces are not capable of processing documents as quickly as systems which recognize a limited number of specific fonts.

It is another object of the present invention to develop an optical character recognition system which allows for recognition of any number of typefaces while still allowing for the rapid processing of documents.

These and other objects of the present invention will be described in more detail with reference to the Detailed Description of the Present Invention and the accompanying drawings.

SUMMARY OF THE INVENTION

An optical character recognition method and apparatus is described. The system of the present invention comprises a scanning means for scanning a document and producing a bit-mapped image of the document. The scanning means is coupled with a computer system having a memory for storing the bit-mapped image and a processor for processing the bit-mapped image and providing as output, data representing the characters on the page.

The present invention discloses methods and apparatus to allow the page to be scanned and characters on the page to be recognized and output in an order which is logically the same order as that employed by a person reading the page. The present invention accomplishes this object by parsing the page into a plurality of blocks and outputting the blocks to a character recognition process in an order which is usually the logical reading order of the page.

The present invention further discloses a character recognition process comprising a combination of a template matching process and a feature analysis process. The feature analysis process allows characters to be recognized based on their shapes. Utilizing the feature analysis process of the present invention, it is possible to recognize characters in any number of different fonts. Further, by utilizing the template matching processes of the present invention in concert with the feature analysis processes, reasonable throughput of documents is achieved without the requirement of providing template libraries.

The present invention further discloses a context analysis process which completes the recognition process by iteratively resolving ambiguities of shape so as to minimize the number of typographic or semantic inconsistencies; residual inconsistencies are flagged as low confidence level identifications.

The present invention further discloses a number of techniques to provide for template matching such as producing representations of characters showing bits in a bit-mapped image of the character which must be off for the character to be recognized and, similarly, producing representations showing bits which must be on. This technique allows for recognition of characters within certain tolerances. The present invention further discloses a process for recognizing characters using character templates when characters are joined closely together.

Further, the present invention discloses use of a plurality of routines utilized in the feature analysis process. Each of these plurality of routines is designed for recognition of one character shape. The present invention discloses methods of describing characters with statistical information and fitting polygons onto different views of the shape of the character. Based on this statistical information and the polygons, the feature analysis processes are able to recognize shapes of characters.

The present invention further discloses a number of methods for distinguishing between text and graphics in a document. During processing of a document for purposes of character recognition, the present invention identifies areas of a document which contain graphics and ignores such areas during the recognition process.

The present invention discloses methods of measuring the relative texture of small areas of the document in order to determine whether the area contains text or graphics.

BRIEF DESCRIPTION OF THE DRAWINGS

FIG. 3(a) illustrates a portion of a page as may be processed by the apparatus and methods of the present invention.

FIG. 3(b) illustrates a bit-mapped image of the portion of the page of FIG. 3(a).

FIG. 12(a) is an illustration of a bit-mapped image of a character as may be utilized by the present invention.

FIG. 12(b) is an illustration of a second version of a bit-mapped image of a character as may be utilized by the present invention.

DETAILED DESCRIPTION OF THE INVENTION

An optical character recognition system is described. In the following description, numerous specific details are set forth such as pixel densities, byte sizes, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Figure 1:
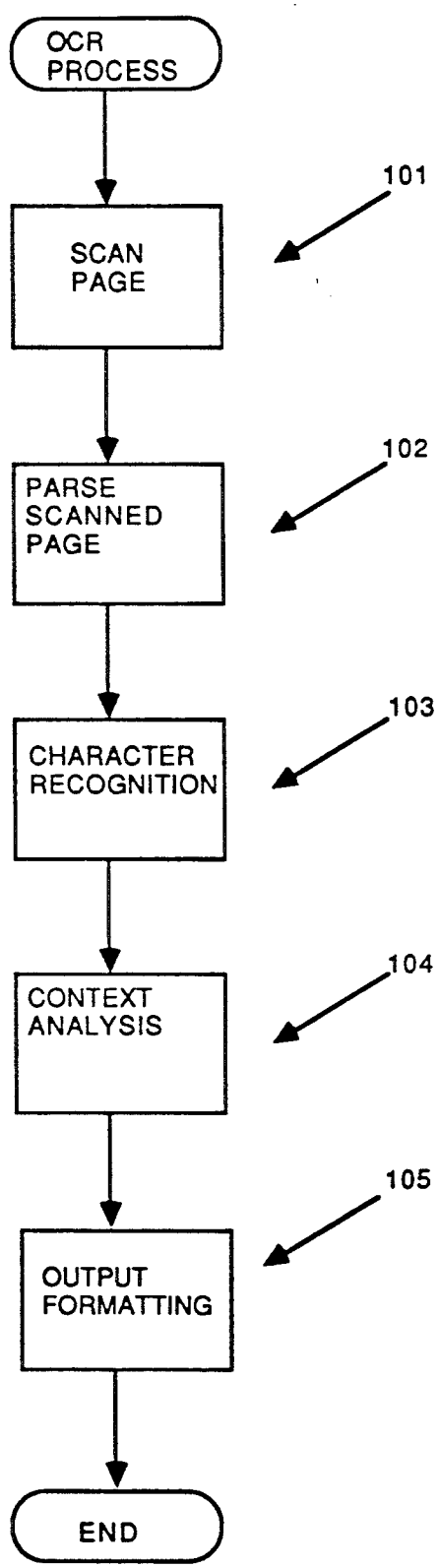
FIG. 1 is an overall flow diagram of the optical character recognition process of the present invention.

Referring now to FIG. 1, an overall flow diagram of the present invention is shown. Utilizing methods and apparatus of the present invention, first a page is scanned, block 101. As will be described, the present invention is capable of isolating and translating the text on a page not only when the page contains only text but also when the page contains a combination of text and non-text areas. Further, the present invention requires no manual intervention to indicate the normal order of reading the text.

After scanning the page, the page is parsed, block 102. Parsing of the page will be described in more detail below and may generally be divided into the functions of page parsing, block parsing and line parsing. After parsing the page, the shapes of individual characters are recognized through a character recognition process, block 103. The present invention is capable of recognizing characters in any number of character fonts.

A process termed context analysis is employed to examine the relative sizes and positions of the shapes recognized during the character recognition process to divide the text into words and to resolve ambiguity of shape, block 104.

Finally, the recognized characters are formatted for output, block 105.

SCANNER

The method and apparatus of the present invention, in its preferred embodiment, is designed to work in conjunction with commercially available microprocessors with 32-bit address spaces. Examples of such microprocessors are the Motorola 68020 and the Intel 80386 microprocessors.

It will be obvious to one of ordinary skill that the present invention may be practiced with any number of computer systems having a processor and memory available for practicing the described methods.

The scanner of the present invention may be any one of several known scanners presently commercially available or may comprise a yet unannounced scanner means. The present invention is designed to work in conjunction with a scanner which is capable of scanning a page of printed information and producing a bit-mapped image of the page. The present invention, in its preferred embodiment, seeks to utilize low-cost optical scanners and personal computer systems in order to provide a low-cost economical optical character recognition system.

PARSING

After a page is scanned, a bit-mapped image of the page is stored in the memory of a computer system or in other means capable of storing such a bit-mapped image. With reference to FIG. 2(a), the parsing process begins with page parsing, block 201. The page parsing process acts on the bit-mapped image to divide the page into a plurality of blocks. The page parsing process attempts to divide the non-blank portions of the page into a plurality of blocks and attempts to distinguish between text and non-text or graphics. The page parsing process attempts to ensure that any individual block contains either only text or only non-text. Blocks containing only non-text are eliminated from further processing.

Briefly, the page parsing process, block 201, analyzes the texture of the scanned image to separate text from graphics and to detect the presence of columns and headlines. Based on a normalized two-dimensional measure of the local density of black-to-white transitions, areas on the page are characterized as either graphics, text or rulings. The areas are grouped into blocks by finding paths of white space surrounding areas of similar texture (e.g. having similar density of black to white transitions). If they are not separated by rulings or excessive white space, adjacent blocks with similar characteristics of texture and alignment are merged together. The page parsing process, block 201, then analyzes the relative placement of blocks to determine which blocks overshadow other blocks in terms of line height, block width and vertical position on the page. The page parsing process can then construct a reasonable interpretation of the page layout. The final output of the page parsing process block 201, is an ordered set of block descriptors that trace the normal reading sequence implied by the derived page layout.

A block parsing process block 202, analyzes black-to-white transitions to compute degrees of skew and locate horizontal paths that divide a given text block into individual lines of text. The block parsing process, block 202, detects vertical rulings and eliminates the ruling from further processing.

The line parsing process, block 203, searches each line from left to right locating vertical paths of clear space. Such vertical paths typically separate individual words and characters from each other. The sections delimited by clear space are processed from the left end of each line and are passed to the recognition routines in a buffer.

A character recognition algorithm, block 103, processes the buffered sections to attempt to recognize individual characters. As will be explained in more detail with reference to the character recognition processing section below, unrecognized line sections are run through a number of processing steps in an attempt to recognize characters. A "delining" process locates and erases from view of the character recognition process underlinings and horizontal rulings. An "unkerning" process isolates characters that are separated by sinuous paths of free space. A "blanding" process erases "pepper" noise. A "thinning" process thins extremely condensed characters to make them recognizable. A "patching" process mends slightly broken character shapes. Line sections which still remain unidentified after applying these processes are buffered in a reject cache for later processing by a "side matching" process and a context analysis process, block 104.

PAGE PARSING

Referring now to FIG. 2(b), a flow diagram of the page parsing process is shown in more detail. The purpose of the page parsing process is to accept as input the bit-mapped page image and provide as output an ordered list of blocks of text. After a page is scanned, a bit-mapped image of the page is produced. From this bit-mapped image, three arrays are produced, block 212.

In the preferred embodiment, the page image is scanned at a resolution of 300 dots per inch, and the parsing process produces its arrays by analyzing every eighth scan line of the page image. It has been determined experimentally that sampling the page every eighth scan line (every 8/300th of an inch in the preferred embodiment) gives sufficient resolution to locate and categorize occupied areas on the page. Further, utilizing only every eighth scan line of the image substantially reduces processing time and storage requirements. However, it will be obvious to one of ordinary skill in the art that different samplings may be utilized without departure from the spirit and scope of the present invention.

Referring to FIG. 3(a), an enlarged portion of a page 300 is shown. The portion of the page 300 shown represents an area of a page which may be covered in 40 scan lines of the preferred embodiment. Each of the squares, such as square 301, represents an area 8 scan lines high and 8 bits wide. The area of the page shown 300 comprises an area 5 squares high and 4 squares wide.

Referring to FIG. 3(b), a bit-mapped image of the same portion of a page is shown. FIG. 3(a) and FIG. 3(b) are illustrative of a problem encountered in optical character recognition systems. In such systems, a letter, such as the letter "0" 302 in FIG. 3(a), may be represented by a relatively rough approximation of the letter "0", such as the representation 312 in FIG. 3(b). Further, text and graphics may be intermixed on a single page. For example, graphics image 303 is shown mixed with the text of FIG. 3(a). The equivalent bit-mapped area is shown at 313. It is obvious to one of ordinary skill in the art that images may suffer from further problems of clarity and crispness as a result of being transformed to a digital bit-mapped image.

A first array generated by the page parsing process of the preferred embodiment is a horizontal population count array. Each element in this array contains a count of the number of one ("1") bits in four consecutive bytes (32 bits of a sampled scan line). Therefore, the area represented by each element of this array is 32 bits wide by 8 bits high. For example, with reference to FIG. 3(b), the 32 bits at scan line 320 has 14 1-bits. Therefore, the 8-bit high by 32-bit wide area, contained in blocks 331, 332, 333 and 334, is represented in the horizontal population count array by an element containing the value 14, the total count of one bits in scan line 320. Scan line 321 has 0 1-bits, line 332 has 9 1-bits, line 323 has 5 1-bits and line 324 has 26 1-bits and each of these 8-bit high by 32-bit wide areas would be represented in the horizontal population count array with corresponding values.

A second array utilized by the preferred embodiment of the present invention is a vertical population count array. Each byte in the vertical population count array contains the total number of one ("1") bits in 4 bytes, one byte from each of four consecutive sampled scan lines. For example, an entry in the vertical population count array may represent bytes 340, 341, 342 and 343 and have a value of 4 (byte 340 has 2 1-bits, byte 341 has 0 1-bits, byte 342 has 2 1-bits and byte 343 has 0 1-bits). In the preferred embodiment, the vertical population count array comprises an array in which rows of the array represent columns of the bit mapped image and columns of the array represent rows of the bit-mapped image. This leads to processing efficiencies in the implementation of the preferred embodiment.

A third array built by the page parsing process of the preferred embodiment is a horizontal phase change array. Each entry in this array represents 32 bits of a sampled scan line and, therefore, the horizontal phase change array has the same dimensions as the horizontal population count array. Each array element contains the count of horizontal phase changes (transitions between runs of 1s and runs of 0s) in the 32 bits. The area represented by each element of the horizontal phase change array is 32 wide by 8 bits high. For example, the 32 bits at line 320 have 7 transitions from 1s to 0s or from 0s to 1s, the 32 bits at line 321 have no transitions, the 32 bits at line 322 have 8 transitions, the 32 bits at line 323 have 2 transitions and the 32 bits at line 324 have 2 transitions.

Based on the horizontal population count and horizontal phase change arrays, a text map array is produced, block 213. Each element of the text map array represents an area 32 bits wide by 8 bits high.

Figure 4:
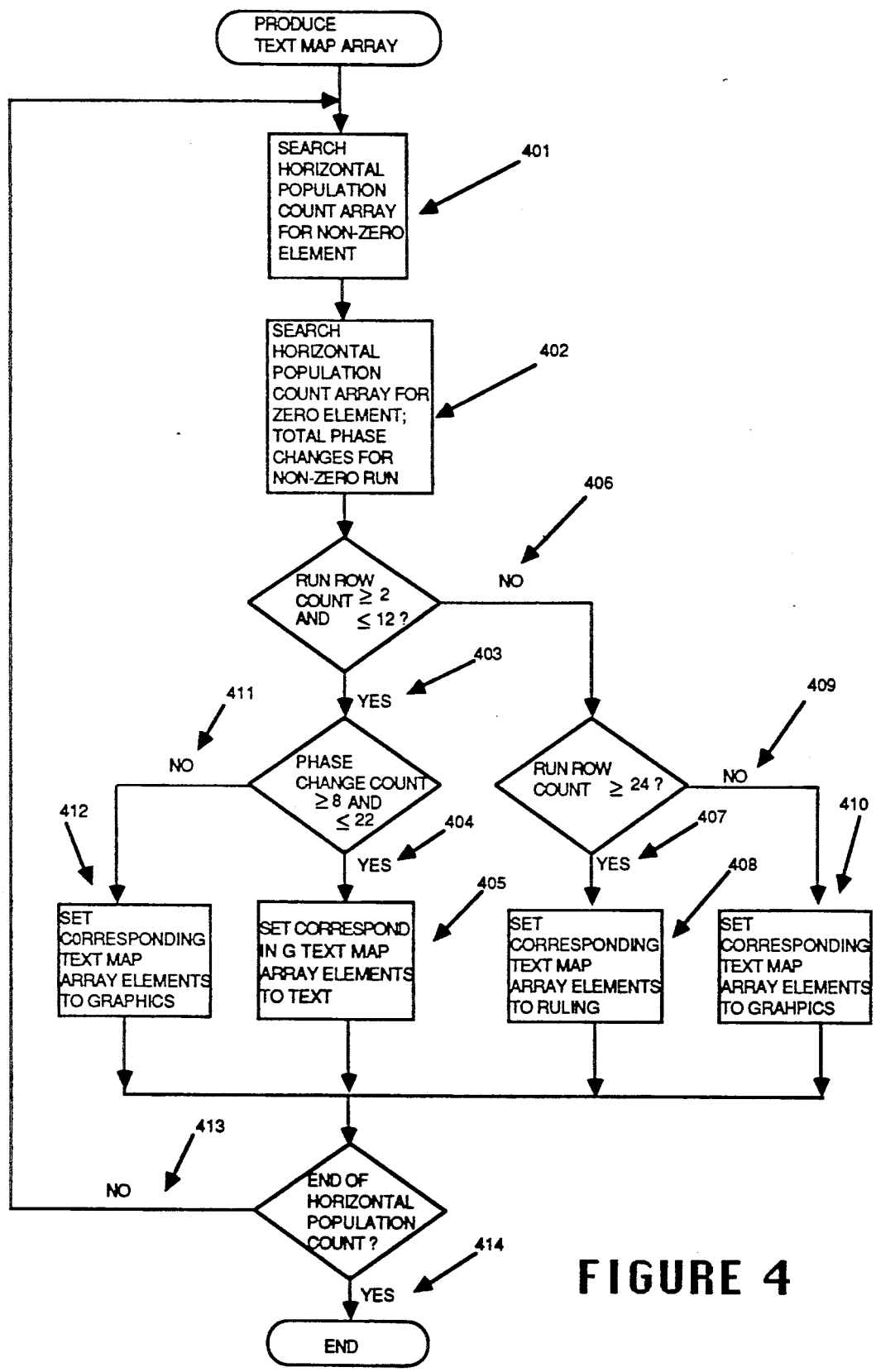
FIG. 4 is a flow diagram illustrating a method of the present invention for producing a text map array.

Referring to FIG. 4, a flow diagram of the process for constructing the text map array is illustrated. The text map array is built by a process which scans down each column of the horizontal population count array searching for a non-zero element, block 401. A non-zero element in the horizontal population count array indicates the presence of text, graphics or rulings in the corresponding area of the bit-mapped image. After finding a non-zero element, the process searches down the column of the horizontal population count array for a zero element. For each element processed in a run of non-zero elements, the corresponding horizontal phase change counts are summed. The process also counts the total number of elements in a run of non-zero elements, block 402.

If the number of rows in a run is greater than or equal to 2 and less than or equal to 12, branch 403, and the summed total of the phase change counts is greater than or equal to 8 and less than or equal to 22, branch 404, the corresponding area of the bit-mapped image has the textural signature of text. The text map array elements corresponding to each of the row elements in the run are set to a code indicating text is present, block 405. In the preferred embodiment, these elements are set to a value of TXTX.

If the row count is not greater than or equal to 2 and less than or equal to 12, branch 406, a check is made to determine if the row count is greater than or equal to 24, branch 407. If the row count is greater than or equal to 24, the corresponding area of the bit-mapped image contains a vertical ruling. The text map array elements corresponding to the horizontal population count elements in the run are set to a value indicating a vertical ruling is present, block 408. In the preferred embodiment these elements are set to a value of TXVR.

If the row count is less than 2 or between 12 and 24, branch 409, it is an indication that graphics are present. The corresponding text map array elements are set to a value indicating graphics are present, block 410. In the preferred embodiment these elements are set to a value of TXGR.

If the row count lies between 2 and 12, but the phase change count is either less than 8 or greater than 22, branch 411, it also indicates the presence of graphics. The corresponding text map array elements are set to the code indicating the corresponding bits of the bit-mapped page image contain graphics, block 412.

If the end of the horizontal population count array has not been reached, branch 413, column-wise processing continues, searching for the next non-zero element, block 401. Otherwise, processing is completed, branch 414.

It has been determined experimentally that the above process for determining whether areas of the bit-mapped image contain text, graphics or vertical rulings is a reasonably accurate mapping. Typically, characters in ordinary text occur in a wide range of heights normally occupying 2 to 12 sampled scan lines. Therefore, the above process tests for run row counts of non-zero elements in the range of 2 to 12 lines.

It has also been determined experimentally that although larger height characters have fewer phase changes in each sample than smaller height characters, the total number of phase changes in a given run of non-zero elements remains substantially constant over a character size range of approximately 4 to 24 points. Therefore, in the presently preferred embodiment a phase change count total for a run of non-zero elements in the horizontal population count array between 8 and 22 is an indicator of printed text.

The page parsing process then makes another pass to attempt to locate relatively large text, block 214. The procedure for locating large text is essentially the same as the procedure described above for building the text map array except that the procedure for locating large text examines every fourth scan line and fourth element in the phase change array. Thus, the large text routine looks at the bit-mapped image with approximately ¼ of the resolution of the process for locating normal sized text and identifies text up to four times larger. In the preferred embodiment, the largest text found by this routine is 48 sample scan lines high. At 300 scan lines per inch, this is equivalent to text of 1.28 inches in height or about 92 points. Text map array cells corresponding to areas in the bit-mapped page image which are found to contain large text by the above process are set to a value to indicate they contain large text. In the preferred embodiment this value is TXTH.

The page parsing process attempts to locate and isolate blocks containing only text from blocks containing only white space, blocks containing graphics, or blocks containing vertical rulings. As part of this process, in the preferred embodiment, the page parsing process attempts to determine the approximate skew of the page and adjust the text map array and the vertical population count array for such skew, block 215.

Figure 5:
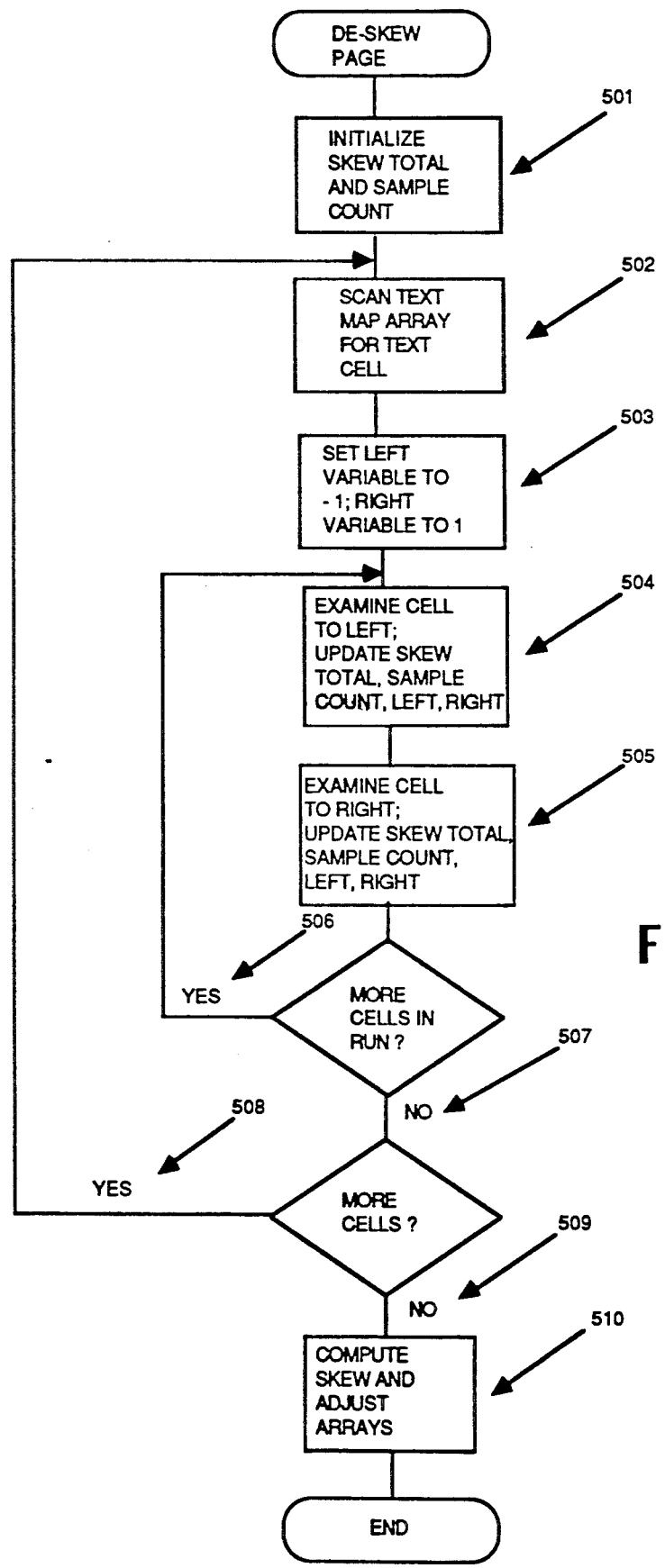
FIG. 5 is a flow diagram illustrating a method of the present invention for de-skewing a page.

Referring to FIG. 5, a flow diagram illustrating the method utilized by the preferred embodiment of the present invention for deskewing a page is illustrated. First, a skew total and a sample count variable are initialized to zero, block 501.

The text map array is then scanned down each column searching for runs of text cells, block 502. When a run of text cells is located a first variable, utilized when examining cells to the left of the present text cell (LEFT), is set to −1. A second variable, utilized when examining cells to the right of the present text cell (RIGHT), is set to 1, block 503.

For each text cell following the first text cell in the run, cells to the left and right of the text cell in the text map array are examined. If the cell to the left is empty (i.e. the cell is not indicated as containing text, graphics or vertical rulings using the above-described TXTX, TXVR, TXTH or TXGR codes), the skew total variable is incremented by the current value of LEFT and the sample count variable is incremented by 1. If the cell is occupied (it contains TXTX, TXVR, TXTH or TXGR), LEFT is set to 1 and the skew total variable and sample count variable are not modified, block 504. If the cell in the text map array to the right of the current cell is empty, the skew total variable is incremented by the value of RIGHT and the sample count variable is incremented by 1. If the cell is occupied, RIGHT is set to −1 and the skew total variable and sample count variable are not modified, block 505.

If there are more cells in the run of text cells, the processing of blocks 504 and 505 is repeated for those cells, branch 506. Otherwise, branch 507, if there are more cells in the text map array they are scanned for another run of text cells, branch 508. After the entire text map has been examined, branch 509, an approximate skew for the page is computed and the text map array and vertical population count array are shifted to compensate for the calculated skew, block 510. The approximated skew is calculated by dividing the skew total variable by the sample count. This process yields an approximation of the skew for the page in number of rows per 4,096 columns. The text map and vertical population count arrays are then adjusted.

The above described process for adjusting for skew assumes that text on a page is generally arranged in horizontal lines on the page. The text map array of the present invention has good vertical resolution (to within 1/38th of an inch). When a page is skewed, blank cells will tend to appear in what should be text cells. The above-described method utilizes these assumptions to determine an approximate skew.

After adjusting for an approximate skew, horizontal and vertical paths of white space through the text are located, block 216. The purpose of locating these paths is to isolate blocks of text. In the preferred embodiment, the deskewed text map array is examined for horizontal paths of white space (white space may be defined as cells in the text map array which are not coded with TXTX, TXVR, TXTH or TXGR). The method of the present invention considers an area to be a horizontal path if a white space area exists which is at least 8 pixels wide and 192 pixels long in the horizontal direction of the page. Similarly, vertical paths are located utilizing the text map array. The preferred embodiment of the present invention considers an area to be a vertical path if it is a white space area which is at least 16 pixels wide and 192 pixels long in the vertical direction of the page. The above-mentioned lengths and widths for horizontal and vertical paths have been determined experimentally by the Applicant to locate horizontal and vertical paths through printed text.

Figure 6:
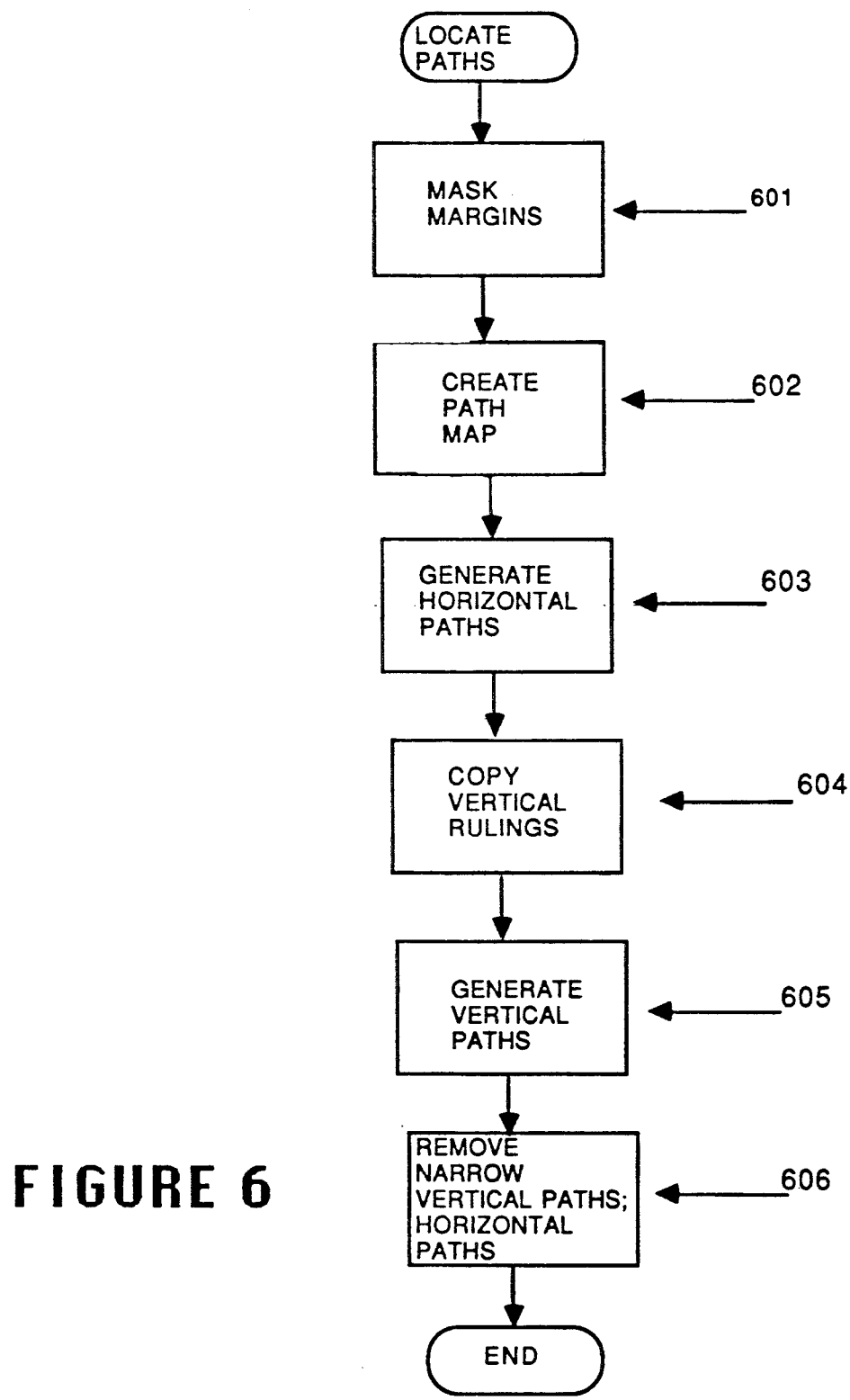
FIG. 6 is a flow diagram illustrating a method of the present invention for locating paths in a scanned page.

Referring now to FIG. 6, a flow diagram illustrating a method utilized by the preferred embodiment of the present invention for locating paths through the text is illustrated. As a first step in locating paths, a process is utilized to cause top, bottom, left and right margins of the page to be effectively ignored, block 601.

The preferred embodiment of the present invention accomplishes masking of the margins by creating a version of the vertical population count array in which each cell of the vertical population count array represents a 32×32 pixel square area of the original bit-mapped image. Effectively, each cell in this version of the vertical population count array represents four consecutive cells in a column of the original vertical population count array. The compressed version of the vertical population count array is then "smeared".

Smearing is a technique utilized by the present invention to shift an image in a number of directions and to preform a logical OR operation on the original bit-mapped image and the shifted bit-mapped image. Effectively, this technique expands areas containing text or graphics while narrowing the intervening spaces and margin areas. Remaining white margin areas are marked as unavailable for the path finding process in the vertical population count array. The smearing technique is described in more detail with reference to the description of character recognition, below.

An array called a path map array is then created for storing horizontal and vertical path information, block 602. The path map array has the same resolution as the text map array. Each column represent 32 bits of a sampled scan line and each row represents a sample taken every 8th scan line of the image. In the path map array, the existence of a horizontal path is indicated by setting one of the bits in an entry in the array; the existence of a vertical path indicated by setting another one of the bits in the entry.

In the preferred embodiment, as a first step in populating the path map array, the left most and right most columns and the top and bottom rows of the path map array are set to indicate the presence of paths. This step ensures that a path that runs into the margin of a page will generate a block. When fully populated, the path map array outlines blocks of text and blocks of graphics with horizontal and vertical paths.

After the path map is created and the left most and right most columns and top and bottom rows of the path map are initialized, horizontal paths are generated, block 603. Each row of the text map array is scanned for runs of empty entries (i.e. entries that are not set to TXTX, TXVR, TXTH or TXGR). If a run is at least a predetermined number of bytes in length, horizontal path bits in the corresponding entries in the path map array are set. In the currently preferred embodiment, the predetermined number of bytes is 6. Each horizontal path that is found utilizing this process is extended by one column to the left of the horizontal path and by one column to the right of the horizontal path. This ensures that the horizontal paths at block edges will meet vertical paths at the edge of the block even if there is either graphics or a headline within 32 pixels of the left or right edge of the block.

The text map array is then scanned to find vertical rulings (i.e. entries which are set to TXVR), block 604. The corresponding entries in the path map array have a bit set to indicate that there is a vertical ruling at that location in the image. This bit will be examined in a later processing set in which relatively narrow paths are removed from the path map array.

Next, vertical paths are populated in the path map array, block 605. Each row of the vertical population count array is scanned for runs of empty entries. If a run is at least a predetermined number of entries long, it is considered as a possible vertical path. In the preferred embodiment the predetermined number is six. If either end of a vertical path fails to coincide with a horizontal path, the vertical path is truncated until it does coincide at both ends with a horizontal path. Vertical paths always extend from an intersection with a horizontal path to an intersection with another horizontal path.

The path map is then examined and all vertical paths which are only one entry wide are removed unless the entry indicates the vertical path was set because of a corresponding vertical ruling in the image. The path map is then scanned again and portions of horizontal paths are erased where they do not begin and end at a vertical path, block 606.

A block locating routine, block 217, utilizes data structures previously built by the page parsing process, such as the page map array, and builds two new data structures; a block map array and a block list.

Figure 7:
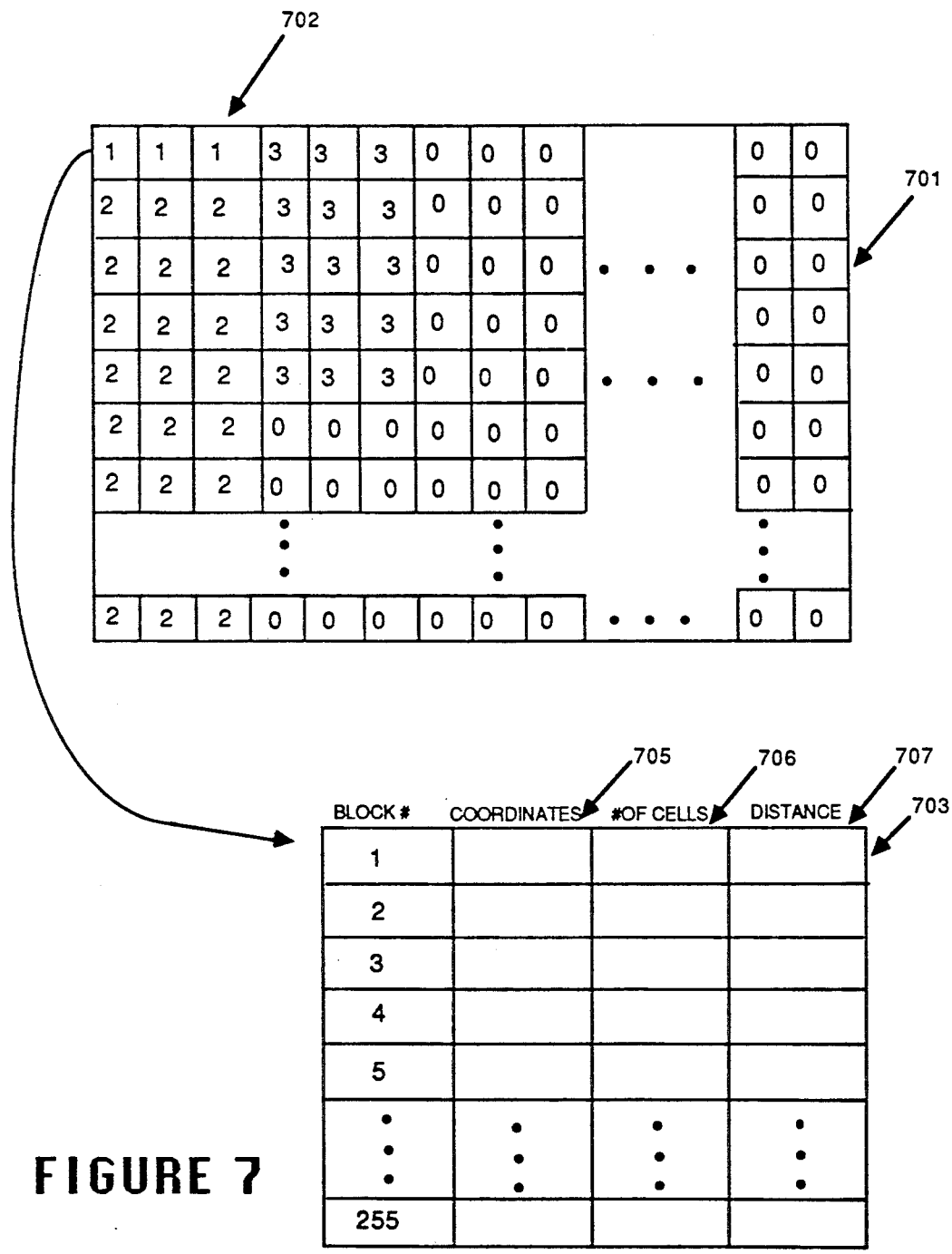
FIG. 7 is a block diagram illustrating two data structures of the present invention.

Referring now to FIG. 7, the block map array 701, comprises an array of the same dimensions as the text map array. Each 1-byte cell in the block map array, such as cell 702, contains a block number for that cell. Cells which have not yet been designated as part of a block are designated in the preferred embodiment with a 0. In the preferred embodiment there can be a maximum of 255 blocks per page image. The block number, such as block number 1 at cell 702, is a pointer into a block list 703. Each entry in the block list comprises information about each block such as coordinates of the block, column 705, cell count information, column 706, and distance to other blocks, column 707. The coordinate information 705 comprises information on each block's top most, bottom most, left most and right most pixels. The cell count information 706 comprises information on the number of text cells, number of large text cells and number of graphic cells within the boundaries of the block.

Figure 2:
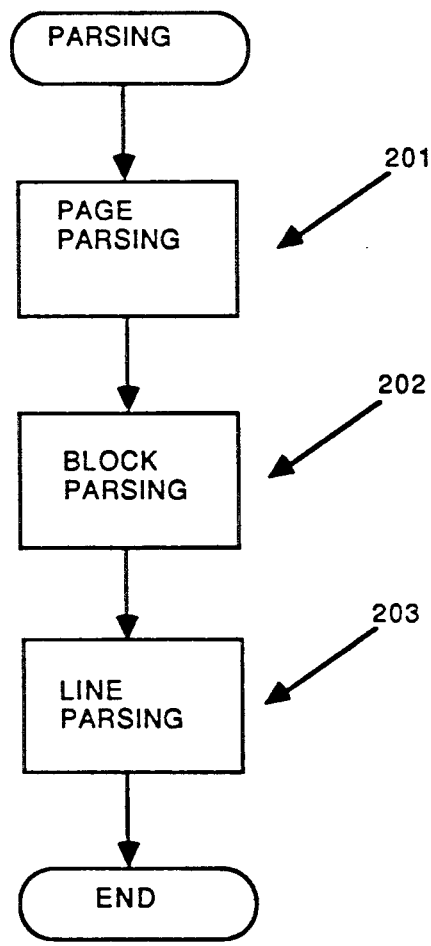
FIG. 2(a) is a flow diagram of an overall parsing process of the optical character recognition process of the present invention.
FIG. 2(b) is a flow diagram illustrating a page parsing process of the present invention.
FIG. 2(c) is a flow diagram illustrating a block parsing process of the present invention.
FIG. 2(d) is a flow diagram illustrating a line parsing process of the present invention.
Figure 2:
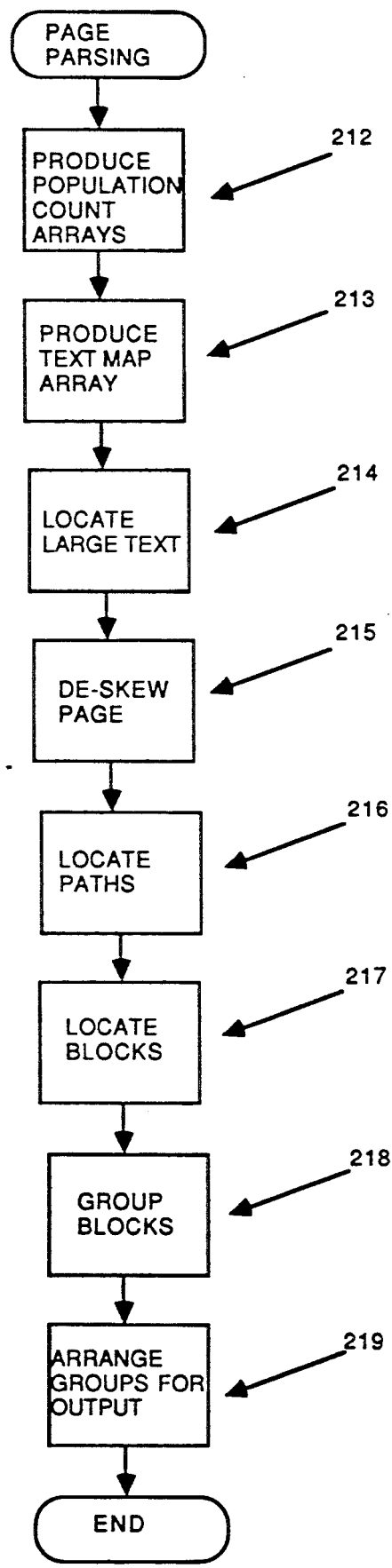
Figure 2:
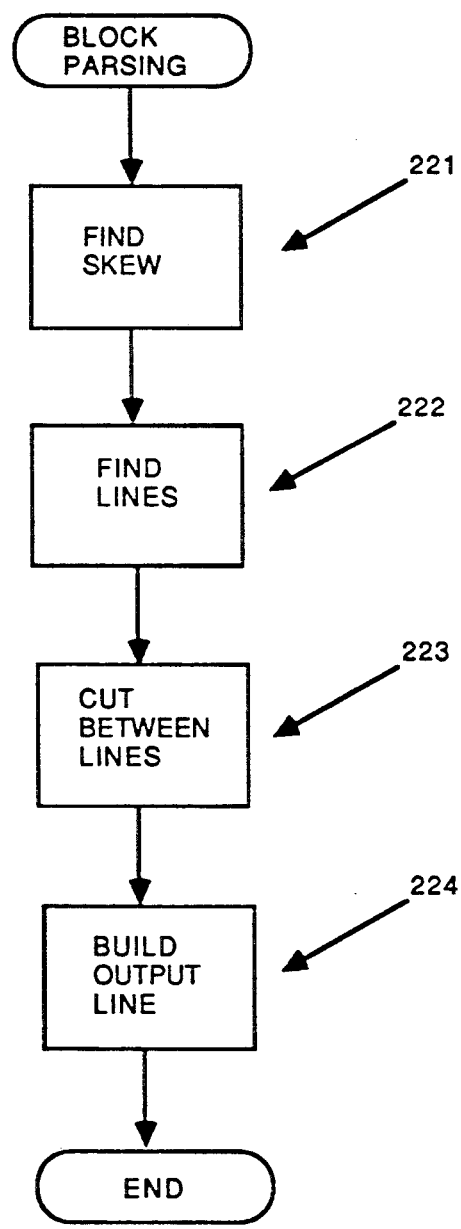
Figure 2:
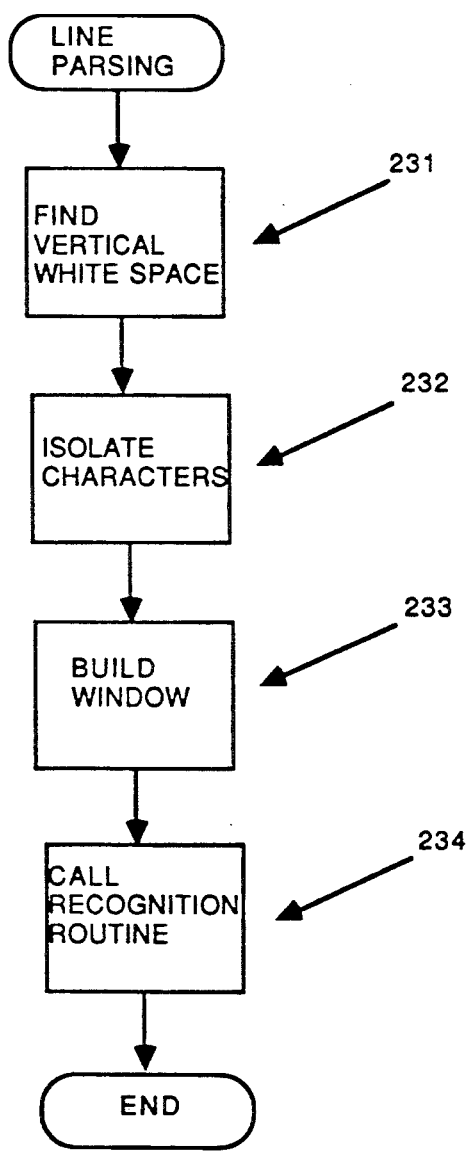
Figure 8:
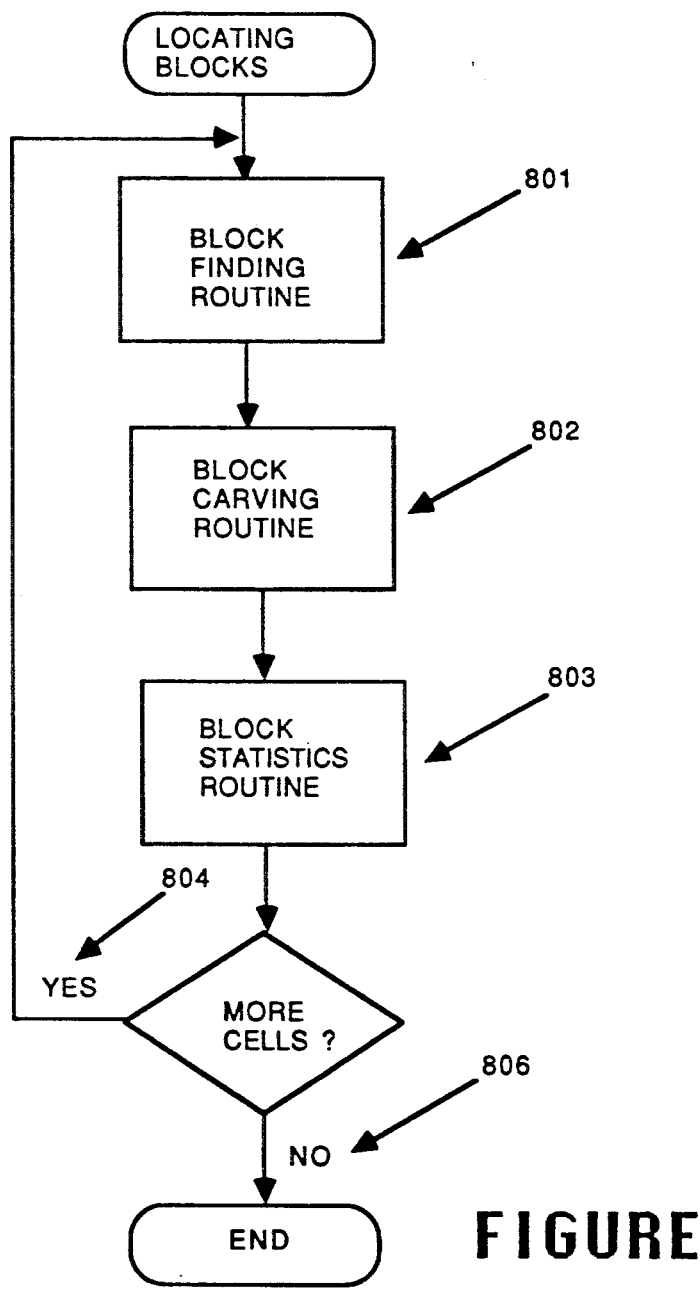
FIG. 8 is a flow diagram illustrating a method of the present invention for locating blocks.

Referring now to FIG. 8, the process of locating blocks, block 217 from FIG. 2, comprises the steps of a block finding routine first scanning through columns of the path map, block 801. The block finding routine scans each cell of the path map for cells which have neither horizontal or vertical paths through them. After finding a cell which has neither a horizontal or vertical path through it, the block finding routine checks the corresponding cell in the block map array. If the corresponding cell in the block map array is unoccupied (i.e. current value is a 0), the block finding routine calls a block carving routine, block 802. The block carving routine examines the path map array for the current cell to find vertical paths on the left and right sides of the current cell. The block carving routine then scans up rows of the path map array. For each row, the block carving routine locates vertical paths on the left and right of each cell above the current cell. When the block carving routine locates a cell whose left or right edge, as determined by the vertical paths, differs from the left or right edge, respectively, of the current cell by more than 1 cell, the block carving routine creates a horizontal path at that cell. The block carving routine similarly processes down the column of the current cell to determine the bottom row for the current block. This process produces a roughly rectangular block to be processed by later described methods of present invention.

After the block carving routine has determined the left, right, top and bottom edges of a roughly rectangular block of cells, a block statistics routine, block 803, is utilized to mark other cells as belonging to the same block. The block statistics routine marks each cell in the block map array bounded by the left, right, top and bottom paths of the current block as belonging to the current block. Further, the block statistics routine counts the number of text cells and graphics cells in the current block by examining the text map array. The relative number of text cells versus graphics cells is used in determining whether the block is classified as a text or graphics block for later processing. The block statistics routine further gathers information on the average length of runs of occupied cells in the text map array for each column in the block. This information is used to determine the approximate height of the characters in the text blocks. The block statistics routine further histograms the number of runs of occupied cells in the columns of the text map array. The median point in this histogram approximates the number of lines of text in the block. The block statistics routine also computes the extreme left, right, top and bottom coordinates of the block. As discussed above, the above described coordinate, count and statistical information is stored in the block list, block 703.

As previously described, the block list of the present invention allows for only 255 entries. The number of entries is limited in the preferred embodiment to allow for certain processing efficiencies. However, it will be obvious to one of ordinary skill in the art that a different number of entries may be utilized in the block list without departure from the spirit and scope of the present invention. In the preferred embodiment, if more than 255 blocks are found utilizing the above-described process, the process is repeated requiring a wider vertical path width to determine block boundaries. It will be further obvious that the present invention could employ a method of requiring wider horizontal paths as well as vertical paths.

After completing processing for a first block, processing continues with the block finding routine, block 801, if more cells remain to be processed, branch 804. After processing has been completed for all cells in the block map array, branch 806, the process of locating blocks is completed.

Blocks are then grouped, block 218. Blocks are grouped according to their location relative to one another, their contents (graphics or text) and their texture (font size and line spacing). Block grouping information is recorded in a group list. Each block in the block list is assigned a group number. The group number is used as an index into the group list.

For each block in the block list, the block map array is scanned above the block, below the block, to the left of the block and to the right of a block. Blocks which are of a different type or texture are not grouped together. Further, blocks which are more than a predetermined vertical distance apart or more than a predetermined horizontal distance apart are not grouped together.

Figure 9:
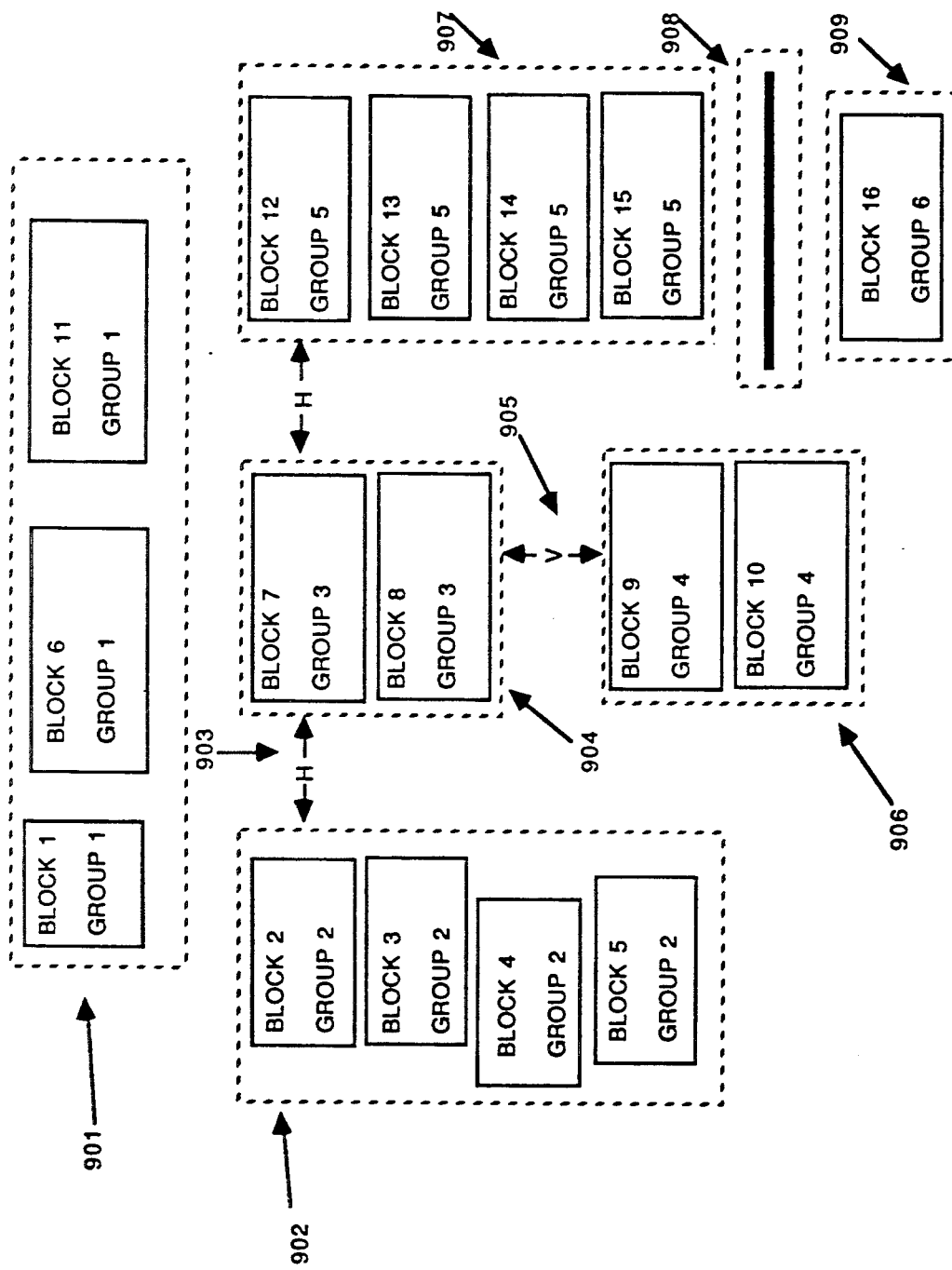
FIG. 9 is a first page image as may be scanned by the apparatus and methods of the present invention illustrating the first page image being divided into a plurality of blocks.

Referring now to FIG. 9, an example of grouping blocks is shown. For example, each of block 1, block 6 and block 11 are grouped as group 1, 901. In the particular example, these blocks might comprise a heading on the page. A heading is often distinguished by having a larger type font than the rest of the text on the page. Because of the different font size, these blocks would be grouped together and not grouped with the remaining blocks on the page.

Block 2, block 3, block 4 and block 5 are grouped together as group 2, 902. The method of the present invention examines blocks adjacent to a current block to determine whether the horizontal distance H 903 is greater than a predetermined value. In the currently preferred embodiment, this predetermined value is 6 columns of cells. Since the horizontal distance H 903 between block 2 and block 7 is greater than the predetermined horizontal distance limit, blocks 7 and 8 are not grouped with group 1.

Blocks 7 and 8 are grouped together as group 3, 904. Blocks 9 and 10 are grouped separate from blocks 7 and 8 and designated group 4, 906, because the vertical distance 905 between block 8 and block 9 exceeds a predetermined limit. In the preferred embodiment, the predetermined limit for vertical distance between blocks is 12 rows of cells. Blocks 12, 13, 14 and 15 are grouped together as group 5, 907. Block 16 is grouped separately as group 6, 909. Block 16 is not grouped with blocks 12, 13, 14 and 15 because of the existence of a graphics block 908.

The present invention further discloses detecting edges of columns on a page by examining successive blocks down the page to determined if the left edge of each block is approximately lined up with the block below it and to determine if the block is vertically within a predetermined distance from its neighbor. If the block is not approximately lined with the block below it or the block is not a predetermined distance from its neighbor, it is assumed that the blocks are not in a column.

After the blocks are grouped, he block map array is rebuilt using the group numbers rather than the block numbers in each element in the block map array. This reduces subsequent processing requirements.

Figure 10:
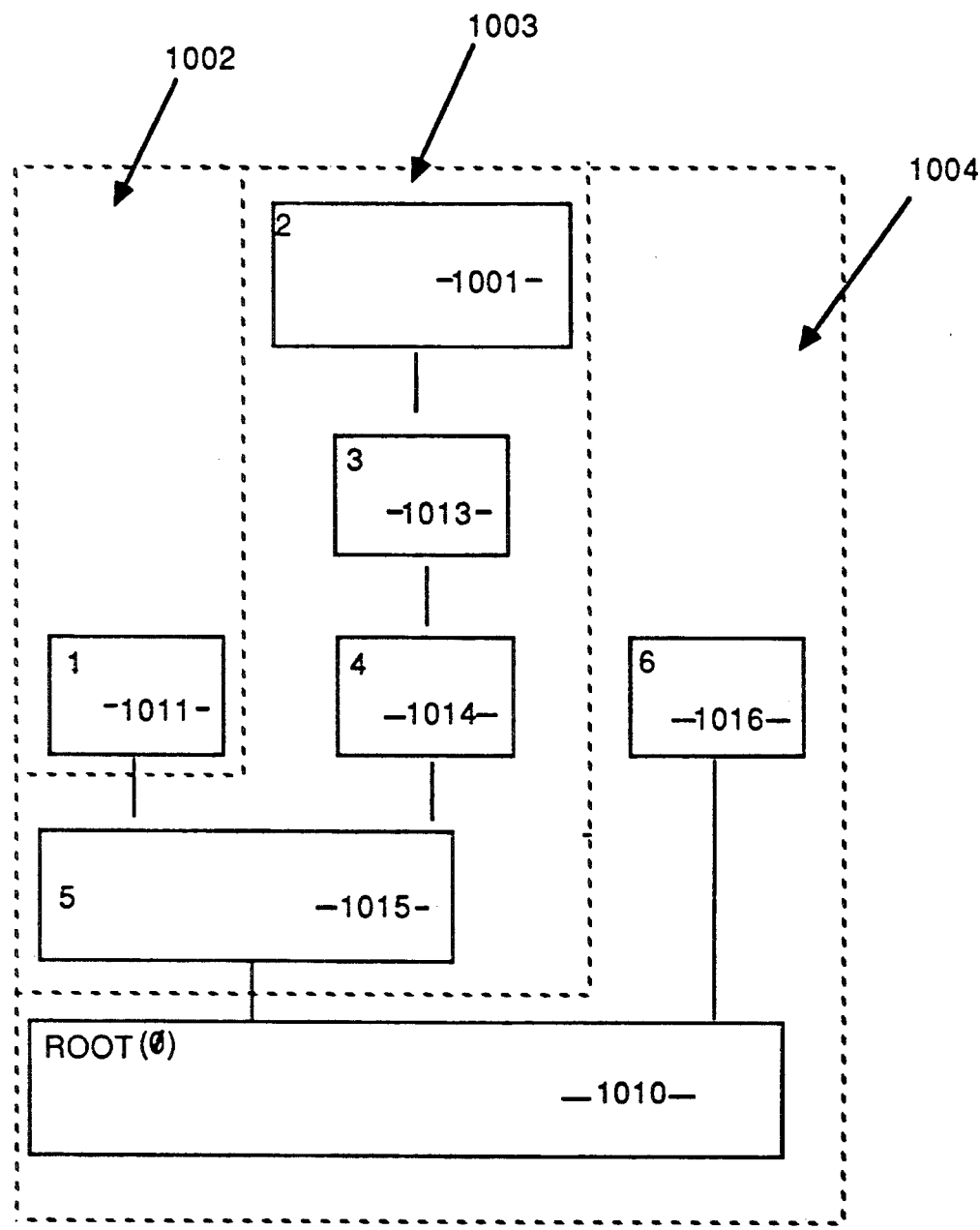
FIG. 10(a) is second page image as may be scanned by the apparatus and methods of the present invention illustrating the second page image being divided into a plurality of blocks.
FIG. 10(b) is a second illustration of the second page image as may be scanned by the apparatus and methods of the present invention.
Figure 10:
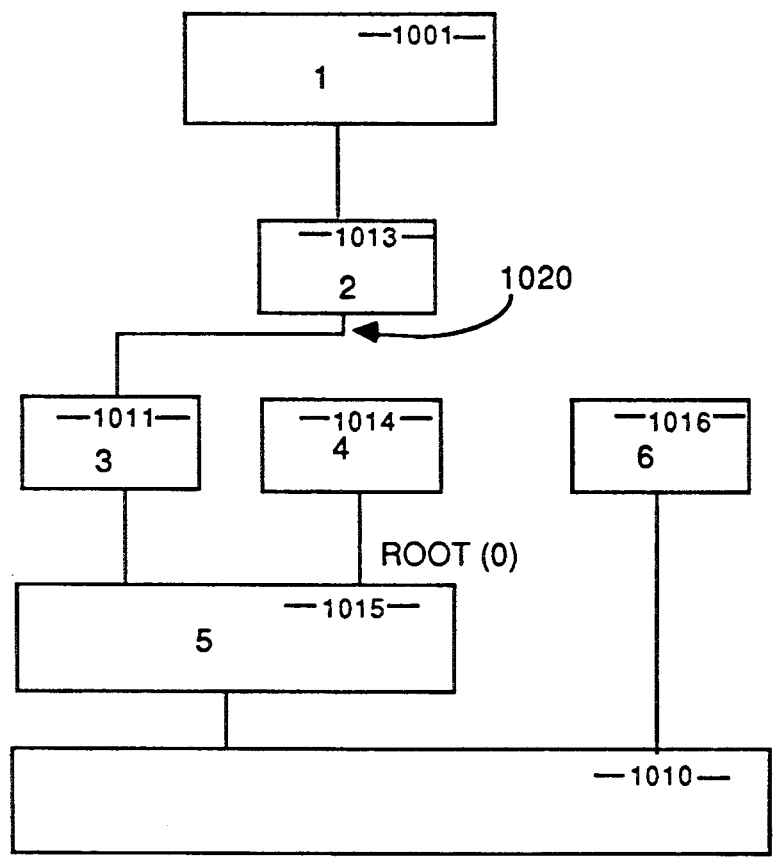

After completing grouping of blocks, blocks are arranged for output to the line parsing routines, block 219. The purpose of arranging the groups for output is to attempt to output groups to the line parsing routines in the logical order in which they would be read. Referring to FIG. 10(a), a block diagram illustrating a page image consisting of 7 blocks of text is shown. The page image comprises a header area 1001 and 3 logic columns of text.

As a first step in arranging groups for output, vertically adjacent groups of blocks are located. Using the information regarding the location of vertically adjacent blocks, a tree is constructed linking the blocks. Each node in the tree represents a text or graphics block and contains pointers to up to 8 blocks above it. If there is more than 1 block above the current block, the pointers are arranged so that blocks are ordered from left to right. The root of the tree is at the bottom of the page. Each block is assigned a node number based on the left-to-right tree traversal order. Node 0 is assigned to the root.

As illustrated in FIG. 10(a), node 1011 comprises a first vertical group 1002. Node 2 1001, Node 3 1013, Node 4 1014 and Node 5 1015 may comprise a second vertical group 1003 being roughly adjacent to the first vertical group. Node 6 1016 and Node 0 1010 may comprise a third vertical group 1004 roughly adjacent to the second vertical group.

To determine the output order of the blocks, the tree is traversed from left to right and each branch of the tree is followed to its end traversing each subbranch from left to right. In general, a node at the end of a branch is output first and nodes from each branch of a subtree or are output before the root node for that subtree.

By way of example, with reference to FIG. 10(a), to determine the normal output sequence for blocks 0–6 the tree is traversed from block 0 (the root) 1010 to the first node on the left, block 5 1015. Nodes branching off of block 5 1015 are then traversed from left to right. Therefore, block 1 1011 is the next block examined. Since no blocks branch off of block 1 1011, it is designated as the first block to be pruned from the tree and sent to the line parsing routines. The next node branching off of block 5 1015 is block 4 1014. Therefore, block 4 1014 is processed next. Block 4 1014 has branches. Therefore, it is traversed and block 3 1013 is examined next. Likewise, branch 1013 is traversed and block 2 1001 is examined since it branches from block 3 1013. As there are no other blocks which branch from block 2 1001, block 2 1001 is the next block output to the line parsing routines. Block 3 1013, having no more branches, is the next block to be output to the line parsing routines, followed by block 4 1014. Since there are no more blocks branching off of block 5 15, block 5 1015 is the next block output to the line parsing routines. The root node 1010 continues to be traversed from left to right and block 6 1016 is processed. Again, since no blocks branch off of block 6 1016, block 6 1016 is the next block sent to the line parsing routines. Finally, since no further blocks branch off of the root node 1010, the root node is passed to the line parsing routines.

In processing blocks, those blocks designated as graphics blocks are included in the above described traversing and sorting process, however, graphics blocks are not passed to the line parsing routines.

When utilizing the above-described method for outputting blocks to the line parser, certain page layouts tend to obtain erroneous results. For example, in the page layout of FIG. 10(a) blocks 2 and 3 may have been headers. In such a case, the logical reading order of the page would differ from the results produced by the above-described process. Therefore, the output order, in the preferred embodiment of the present invention of blocks, is rearranged by a recursively called routine. The routine is called for each node having more than one upward branch. For example, with reference to FIG. 10(a), the routine would be called when processing block 5 1015 and the root block 1010.

The recursive routine finds the top block of each branch. Starting with the left most branch, the routine examines the nodes on the next branch to the right. If the top of a node of the right branch is higher on the page image than the top of a node of the left branch (either the right node overlaps the left node or the bottom of the right node is above the top of the left node) the subtree on the right branch is grafted onto the left branch. This process repeats for each node which satisfies the above criteria.

For example, node 2 1001 and node 3 1013 are both above node 1 1011 so node 3 1013 is logically grafted, for purposes of output to the block parsing routines, to node 1 1011. The tree after processing by this recursive routine is shown with reference to FIG. 10(b). In FIG. 10(b), the block numbers have been reassigned in left-to-right tree traversal order. The new block numbers indicate the order of output to the page parsing routines. The blocks are output to the page parsing routines starting with block 1 1001, then block 2 1013, block 3 1011, block 4 1014, block 5 1015, block 6 1016 and then the root node, block 0 2020. The logical connection between blocks has been modified at branch 1020.

A number of final adjustments are made as part of the page parsing process. These adjustments include processes for further merging of adjacent blocks after the block output order is known, enlarging blocks into the white space surrounding the block, constructing a mock-up of the page image showing the placement and order of text blocks, reskewing the block map and path map arrays to reverse for the skew correction applied earlier in the process and building a block descriptor array comprising descriptive information about each block.

Importantly, the mock-up of the page image showing the placing and order of text blocks may be displayed on a device such as a graphics terminal by the user. The user may then alter the output order of the blocks if desired. The process allows for user correction of the output order of the blocks where the page parsing routines have made incorrect assumptions regarding the logical reading order of the page.

BLOCK PARSING

Each block produced by the page parsing routine is passed, in the desired order, to the block parsing routine. The block parsing routine attempts to parse each block into individual lines of text. The block parsing routines utilize data structures built by the page parsing routines and the bit-mapped image of the input block to isolate individual lines and to add data to the block descriptive information in the block list. The data added to the block list comprises information identifying the leftmost column in the block, the width of the block, the height of the block, the number of lines in the block and the starting line number.

After receiving an input block, the block parsing routine computes the skew of the block, block 221 of FIG. 2(c). The skew of the block is computed based on a detailed analysis of the phase change counts in the horizontal phase change array. Next, individual lines are isolated, block 222, by examining the bit-mapped image for the block in conjunction with the phase change count analysis to determine the location of the possibly skewed horizontal white space which separates lines.

The block parsing process isolates and cuts between lines, block 223, by locating horizontal paths of least resistance that most closely approximate the calculated skew. The roughly horizontal path that separates lines of text may be interrupted by characters which have descenders or ascenders. For example, lowercase "g", "j", "p", "q", and "y", all have descenders. The block parsing routine cuts around such characters to ensure that the tails of such characters are left with the proper line when the line is passed to the line parsing routines.

Whenever the block parsing routine is unable to avoid or skirt around an obstacle within given tolerance levels, the block parsing routine measures the dimensions of the obstacle to determine whether the obstacle is a vertical ruling. If the obstacle is a vertical ruling, the obstacle is erased. If the obstacle is not a vertical ruling, the block parsing routines cut through the obstacle. Individual lines are isolated and buffered for processing by the line parsing routines, block 224.

LINE PARSING

Each line output by the block parsing routines is used as input to the line parsing routines. The line parsing routines attempt to segment a line of text into individual characters. Referring to FIG. 2(d), the line parsing routines of the preferred embodiment first find all columns in the line that have white space from the top of the line to the bottom of the line, block 231.

The columns or segments having white space from the top of the line to the bottom of the line are then isolated and framed, block 232. To frame segments, the line parsing process determines the left, right, top and bottom boundaries for pixel areas bounded by vertical white space. The boundaries are computed such that as little white space as possible is left around the pixel area.

If the resulting "framed" pixel area is wider than 64 pixels (the widest character width that may be processed by the preferred embodiment without reducing the resolution of the character) or the ratio of the width to the height of the framed pixel area is greater than 3 to 2, it is assumed that the framed pixel area comprises more than one character.

In such a case, the framed pixel area may comprise "kerned" characters. Kerned characters are characters which overlap each other, although they do not actually touch. In such a case, vertical white space may not exist between the characters. An example may be the letter "T" followed by "o". If a "T" is placed sufficiently close to an "o", no vertical white space occurs between them.

An unkerning process is applied to such relatively wide pixel frame areas. The unkerning process computes the leftmost clear path from the top of the line to the bottom. A clear path is defined as a list of connected vertical and horizontal segments that trace a clear path between two characters. If the unkerning processing is successful in finding a clear path, the left, right, top and bottom boundaries are recomputed for the pixel frame area to the left of the clear path. If the resulting frame is still wider than 64 pixels or still has a ratio of width to height of greater than 3 to 2 or if no clear path was found, an attempt is made to detect and remove underlining. If the process is successful in removing underlining, the line parsing process again attempts to find vertical white space.

After a pixel frame has been found which is not too wide, a character is considered to have been isolated, block 282 and a character window is created for the character recognition routines, block 233. In the preferred embodiment of the present invention, a character window is a buffer area capable of holding characters up to 128 rows by 128 columns or 64 rows by 192 columns. If the pixel frame is too large to be placed into a character window, the pixel frame is scaled to allow it to fit into the window. The pixel frame is copied one row at a time into the window. If the framed pixel area was derived as a result of an unkerning process, the right border of the pixel area is defined as the clear path found during the unkerning process. Otherwise, each row copied into the window consists of the bits in corresponding rows of the pixel frame area between vertical white spaces (i.e. the presumed isolated character).

Any window which is built which has a column width of more than 128 pixels is put into a reject cache for later processing. Otherwise, the character recognition routines are called and the window is passed to the character recognition routines, block 234. If a character is successfully processed by the character recognition routines, a code for its recognized shape is placed in a buffer area termed a "galley". Windows which are rejected by all of the character recognition routines are added to the reject cache for later processing.

CHARACTER RECOGNITION

Figure 11:
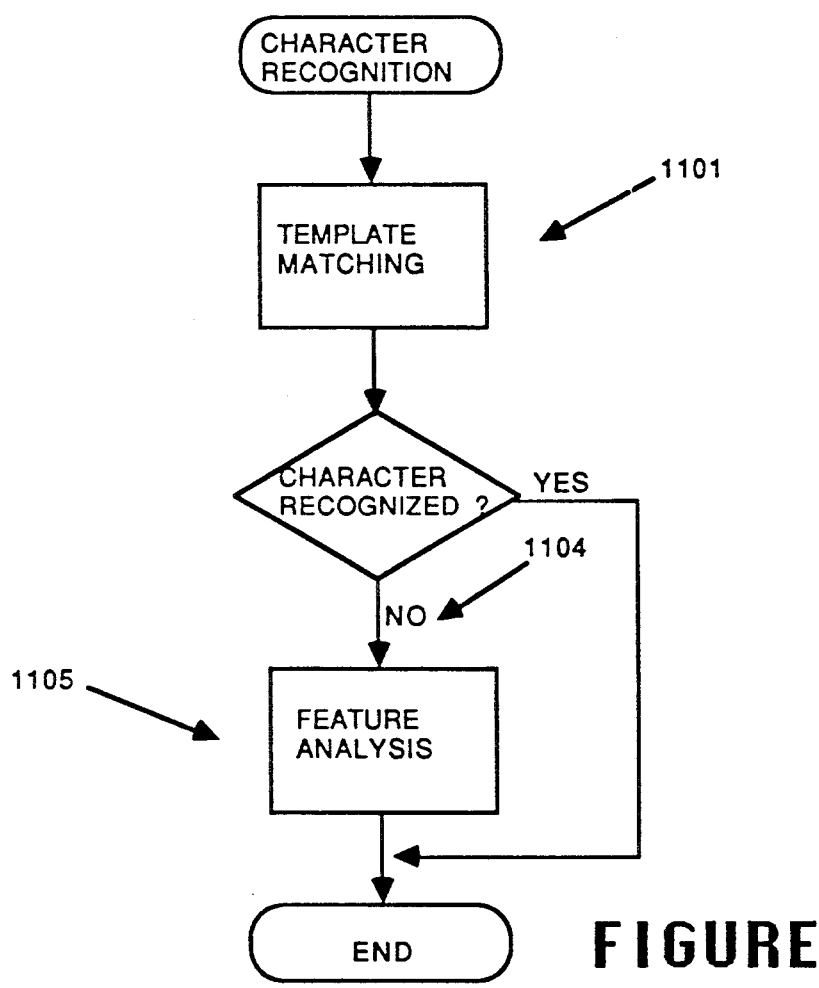
FIG. 11(a) is an overall flow diagram of a character recognition process as may be utilized by the present invention.
FIG. 11(b) is a flow diagram of a template matching process as may be utilized by the present invention.
Figure 11:
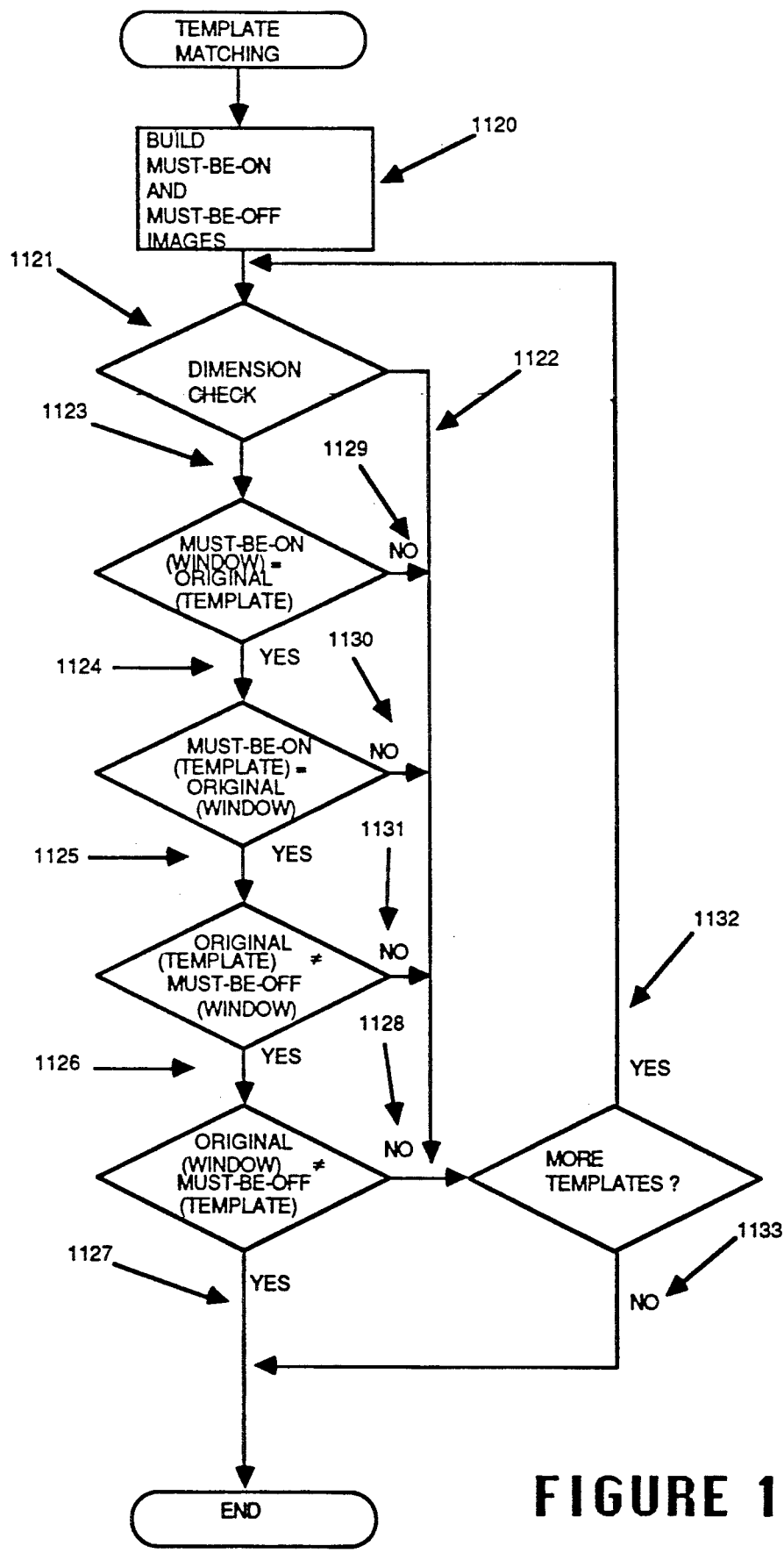

Referring now to FIG. 11, the character recognition process comprises the steps of template matching, block 1101, followed by feature analysis, block 1105, if the character was not recognized by the template matching step, block 1101.

The template matching process, block 1101, attempts to match characters passed in windows from the line parsing process to templates of already identified characters. The feature analysis process, block 1105, attempts to recognize features of characters which could not be matched to templates. Based on recognizing these features, the character shapes are identified.

As one inventive aspect of the present invention, characters which are recognized by the feature analysis process are used as templates for recognition of later occurring characters. In the preferred embodiment, a template cache is built for each new document. The template cache comprises characters which have been recognized through the feature analysis process for the current document. Characters in the template cache are utilized in the template matching process. By building the template cache based on characters recognized in the document through the feature recognition process, the present invention allows for recognition of any font which is recognizable with the feature analysis routines. By combining elements of feature analysis and template matching, the present invention offers the performance advantages of a template matching system with the omnifont characteristics of a feature analysis system.

TEMPLATE MATCHING

The template cache comprises information for each available template for the current document. For each template, a header field contains identification information for that particular template. The header field also comprises offset pointers to three pixel patterns which are used by the template matching process.

The first pixel pattern is the original pattern of the character as recognized by the feature analysis process. In the preferred embodiment, the original pattern of x rows by y columns is stored as a two-dimensional array with the rows zero padded up to a word boundary.

A second pixel pattern, termed a "must-be-off" pattern, is derived from the original pattern. The must-be-off pattern comprises x+1 rows and y+1 columns with the rows also being zero padded to a word boundary.

A third pixel pattern, termed a "must-be-on" pattern, is derived from the original pattern and comprises x−1 rows by y+1 columns. The actual image of the must-be-on pattern only occupies x−2 rows by y−2 columns. However, in the preferred embodiment an area of x−1 rows by y+1 columns is reserved for processing convenience to ensure that the array is as wide as the must-be-off array.

As will be apparent from the following description of the template matching methods of the present invention, characters will be recognized by the template matching process when the characters are within certain predetermined tolerances of the templates. Allowance for characters being within predetermined tolerances is essential because two bit-mapped images of the same character rarely, if ever, match exactly. Image digitization is sensitive to differences in registration and the digitization process itself introduces edge noise. Furthermore, characters are often broken or otherwise deformed due to poor image quality when the characters were originally printed, when the substrate which is being scanned has been copied or when the substrate is optically scanned for the character recognition process. Therefore, a simple bit-by-bit comparison is not adequate for a recognition process. The must-be-on and must-be-off image patterns are utilized by the present invention to allow for some margin of difference between characters.

The must-be-off array comprises a pixel image indicating which pixels in the window must be off (i.e. be set to 0) in order for the window to be considered a match against the template. Referring to FIG. 12(a) a bit-mapped image of the character e 1201 is illustrated. The x's in character e 1201 designate pixels which are on in the original image in the template cache.

In the preferred embodiment, the must-be-off image indicates pixels which are one or more pixels away from any on pixel in the original bit-mapped image. FIG. 12(b) illustrates the character e 1202 showing the must-be-off pixels as dashes. In the preferred embodiment, the must-be-off pixels are computed by "smearing" the original pixel image. The smearing is accomplished by performing logical OR processes on each row of the original pixel image. Each row of the original pixel image is logically OR'ed with a copy of itself shifted left one bit. The result is logically OR'ed with the original row shifted right one bit. The result of this step is logically OR'ed with the result of applying the same step to the row immediately prior to, or above, the current row. The result of this step is logically OR'ed with the similarly processed row immediately subsequent to or below the current row. The result of this operation is an image of the original character in which every pixel of the original bit-mapped image is surrounded by eight on pixels; the pixel above, below, to the right, to the left, and the 4 pixels at 45°, 135°, 225° and 315° from the original pixel. This effectively adds a one pixel layer of girth to the original character image. The complement of the resultant image is saved as the must-be-off pattern.

The must-be-on image comprises a character image showing bits which must be on for a match to occur. In FIG. 12(b), the character image of the character e 1202 is illustrated with plus signs showing pixels which must be one for a match to have occurred. To compute a must-be-on image, each row of the original pixel image is logically AND'ed with a copy of the row shifted one bit to the left. The result is logically AND'ed with a copy of the row shifted one bit to the right. That result is logically AND'ed with a similarly processed image of the row immediately above the current row. The result of the operation is then logically AND'ed with the similarly processed row immediately below the current row. When performing the logical AND operation with the rows above and below the current row, the above and below rows have been logically AND'ed with images of themselves as described in the first two steps of this process before performing the logical AND operations with the current row. This process produces an image of the original character in which only those pixels which were surrounded on all eight sides remain on. Effectively, this causes the image to be one pixel layer less thick than the original image.

Utilizing the must-be-on and must-be-off arrays for comparing the input characters to templates allows for tolerances to be used in performing the matching. Although the preferred embodiment allows for a one pixel tolerance in testing for matches, it will be obvious to one of ordinary skill in the art that alternative embodiments may allow for different tolerance levels. An alternative embodiment which allows for less stringent tolerances may lead to higher early match rates and, thus, faster processing. However, such an embodiment may have a greater rate of errors in identification of characters due to the less stringent tolerances.

Referring now to 11(b), each time a new window comprising unidentified pixel information is received from the line parsing routine, must-be-on and must-be-off images are created for the unidentified image using the above-described processes, block 1120. The unidentified image in the window is then compared against characters in the template cache. The templates are ordered, for purposes of comparison, in a most recently matched order. Each time a match occurs against a template a counter stored in the template header is incremented.

When a template is first created as a result of being recognized by the feature analysis routines, the template's match counter is set to 0. In the preferred embodiment, new templates (i.e. templates with a match count of 0) are inserted at the beginning of the template queue. When an unidentified image processed by the template matching routines matches a particular template, the particular template's match count is tested to determined if the match count is 0. If the match count is 0, the preferred embodiment of the present invention examines the image in the character window utilizing the feature analysis routines (described below) to obtain confirmation that the image in the character window is the same character as identified by the template. If the feature analysis routines confirm the template and the image in the character window is the same character, the match count is incremented. Otherwise, the process assumes that the template yields unreliable results and the template is discarded from further processing. The recognition of the image in the character window then continues by attempting to match the image in the character window against other templates in the template cache.

The first step in matching an image in a window against the template is to construct must-be-on and must-be-off arrays from the unidentified image, block 1120. Next, a dimension check is made, block 1121. Images which differ from a template in their height or width by more than one pixel can't match the template, branch 1122. If the dimension check is passed, branch 1123, the must-be-on array for the unidentified image in the window is compared against the original bit-mapped image of the template. If all of the pixels in the must-be-on array for the unidentified image are on in the original template, branch 1124, a second test is performed.

The second test determines whether all of the pixels in the must-be-on array for the template are on in the unidentified bit-mapped image in the window. If all such bits are on, branch 1125, the original bit-mapped image of the template is compared against the must-be-off array for the image in the window. All pixels indicated in the must-be-off array for the image in the window must be off in the original template for a match to have occurred. If this test is passed, branch 1126, the unidentified bit-mapped image in the window is tested against the must-be-off array for the template. If all of the pixels indicated by the must-be-off array for the template are off in the bit-mapped image in the window, the template is judged a match and branch 1127 is taken.

As described above if the template has a match count of 0, the image in the character window is also analyzed with the feature analysis routines to confirm the identification. Otherwise, the identification code for the recognized shape is placed in the galley for later processing by the context analysis routines.

If any of branches 1122, 1128, 1129, 1130 or 1131 are taken as a result of not passing the corresponding test described above and if more templates exist in the template cache, branch 1132, the same series of tests are made against each successive template in the template cache until a match occurs or the cache is exhausted.

If there are no more templates in the template cache, branch 1133, none of the current templates match the unidentified image. This occurs whenever the unidentified image differs in font, size or registration from all of the characters in the template cache. The no-match condition may also be a result of characters which, although of the same font and size, are not a close enough match to be within the "edge noise" tolerances of the template matching routines.

In any event, if the image is not recognized, branch 1104 of FIG. 11(a), the feature analysis routines are called using the image in the character window as input, block 1105.

FEATURE ANALYSIS

The preferred embodiment of the present invention discloses use of a plurality of routines for analyzing the features of images passed as input to the feature analysis process to determine the category of the shape of an unidentified image in the character window. The plurality of routines comprises one routine for each unique species of shape in the standard character set. Each of these individual routines is capable of analyzing an image in a character window and providing as output an indication whether or not the image belongs to the generic shape category discriminated by the routine. The character recognition routines are exited when one of the routines responds with a positive indication that the image in the character window is the shape corresponding to that particular routine. If none of the feature analysis routines respond positively, the shape of the image in the character window remains unidentified. In such a case, further processing is performed to try to identify the shape of the image in the character window.

Each of the plurality of routines will be termed an "isit". The name "isit" is useful in describing the routines of the preferred embodiment because the routines determine whether a character in the character window is a particular character (e.g. "is it" an a). In the preferred embodiment isits exist for letters, numerals and special symbols such as commas, quotation marks, semicolons, etc. It will be obvious to one of ordinary skill in the art that the method of utilizing isits for determining whether an image in a character window is a particular character may be implemented for a wide number of alphabetic character sets. For example, isits may be implemented for cyrillic character sets such as the character set used in the slavic languages or other character sets such as the character sets for Hebrew or Arabic.

In the preferred embodiment, the isits distinguish characters based on their shape. Therefore, characters sharing the same topography are recognized by a single isit. For example, the letter lower case "p" and the letter upper case "P" are recognized by the same isit. The letters lower case "u" and upper case "U", lower case "s" and upper case "S", lower case "o", upper case "O" and zero "0", etc., are other examples of characters with the same or similar topography which would be recognized by the same isits. For each shape or topography, characteristics of the shape have been chosen and measured experimentally such that a particular isit can distinguish the shape of its character from the shape of other characters through a wide range of font styles.

In the preferred embodiment, an isit provides as output either an ASCII code for a particular character or a code indicating the character is recognized as belonging to a particular class of characters or a reject code indicating the character is not recognized. An output of the ASCII code for a particular character indicates the character's identification by the isit routine is unequivocal. The ASCII code returned is the standard ASCII code for the particular character. A code indicating the character belongs to a particular class of characters restricts any subsequent feature analysis to a particular set of isits.

Figure 13:
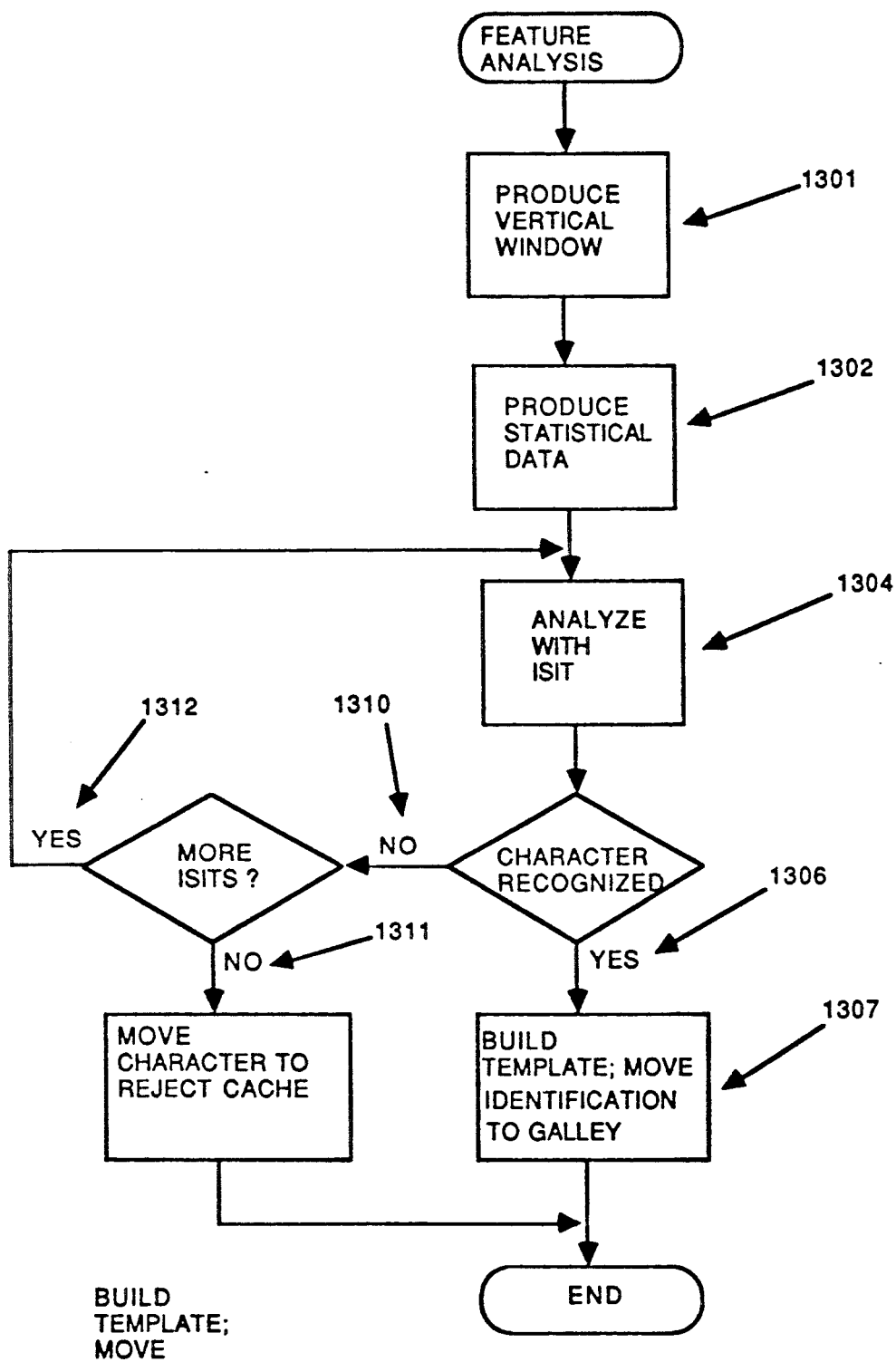
FIG. 13 is a flow diagram of a feature analysis process as may be utilized by the present invention.
Figure 14:
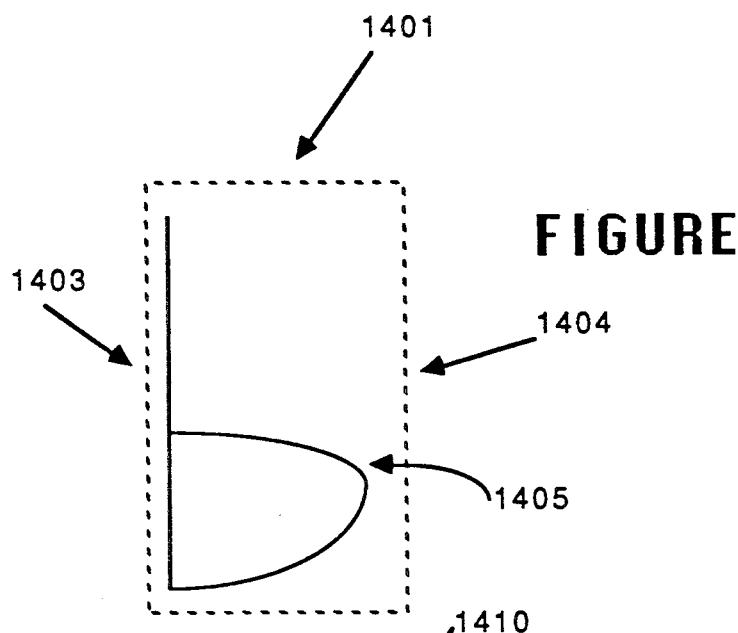
FIG. 14(a) is an illustration of a first character window as may be utilized by the present invention.
FIG. 14(b) is an illustration of a second character window as may be utilized by the present invention.
FIG. 14(c) illustrates a polygon fitting method of the present invention.
Figure 14:
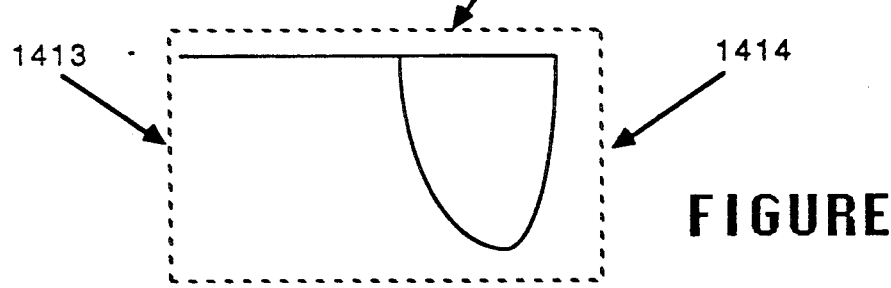
Figure 14:
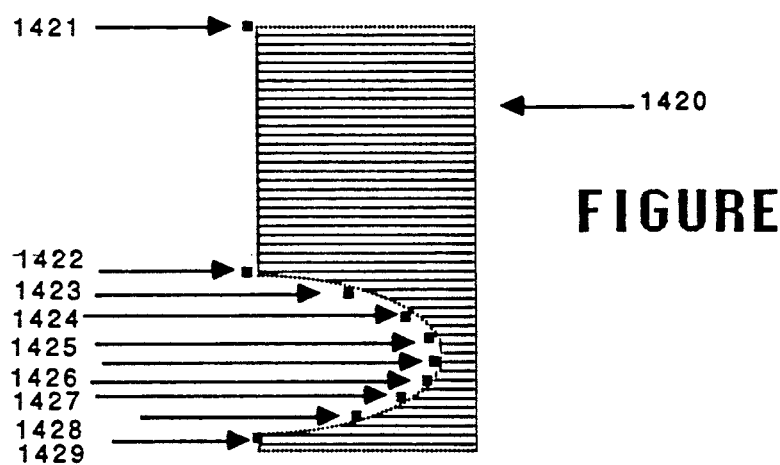

Referring now to FIG. 13, a flow diagram illustrating the feature analysis process of the present invention is shown. For each image received as input to the feature analysis process, statistical data from a horizontal window and a vertical window is used by the isits. The horizontal window is the original character window having the bit-mapped image of the character. For example, referring to FIG. 14(a), the character "b" is shown in horizontal character window 1401. A vertical window is derived from the horizontal window 1401, block 1301. The vertical window may be thought of as the image in the horizontal window 1401 laid on its side with each of the rows of the horizontal window reversed in position. For example, FIG. 14(b) illustrates a vertical window for the image of the character "b" in vertical window 1410.

Statistical information is produced by examining the bit-mapped images in the horizontal window 1401 and vertical window 1410. The statistical information comprises profile data, polygon representations of the characters, phase change information, and counts of the number of on pixels in each row of the character.

The present invention's polygon fitting algorithms dampen the effects of noise in the images to be identified and greatly reduce of the volume of data that has to be processed by the feature-direction routines. Further, it has been determined that polygon representations of character images are consistent over a wide range of character sizes, e.g., the character "i" produces substantially the same polygon representations in a wide range of type fonts.

For each face of a character window, profile data and four polygons are derived. The faces of a character comprise the left and right sides 1403, 1404, 1413 and 1414 of the horizontal and vertical windows. The profile data comprises an array having one element for each row of the window. Each element holds a value, measured in columns, representing the distance from the edge of the frame to the first on pixel in that row. For example, referring to FIG. 14(a) the first on pixel in each row of face 1403 would be the first on pixel in the spine of the letter b. For face 1404, the first on pixel for the top half of the letter b would be the first on pixel in the spine of the letter b. For the bottom half of face 1404, the first on pixel for each row is the pixel located at the outside edge of the loop 1405 of the character b.

A first polygon is developed for each face. The polygon comprises a plurality of line segments fitted to a profile of the character viewed from the face. The line segments of the polygon are within a predetermined tolerance value of the profile of the character. For example, with reference to FIG. 14(c), a profile 1420 of the character b viewed from face 1404 of FIG. 14(a) is shown. The points on a polygon for describing this profile are shown at points 1421 through 1429. In the preferred embodiment, there are a maximum of 16 points in the polygon used to described a particular profile and for each segment, its slope and the difference in slope from the prior segment are computed and saved. It will be obvious to one of ordinary skill in the art that a larger number of points may be used to described a polygon with a corresponding increase in processing and memory resources.

The polygon fitting algorithms determine the points such as points 1421 to 1429 on the profile image 1420. The first step in the polygon fitting process is to assign polygon points 1421 and 1429 at each end of the polygon. A recursive routine is called using as inputs the end points of a line segment, such as points 1421 and 1429, the profile image 1420 and a tolerance value. The tolerance value determines the "snugness" of the fit of the polygon to the profile image 1420.

In the preferred embodiment, the tolerance (t) is measured in 128ths of a pixel and is computed based on the long and short dimensions of a window, according to the following formula:

Tolerance $(t) = (13/4)x + 64$ if $x < 28$;

and $(t) = 5x$ if $x \geq 28$;

where
$x = (3 *$ (length of the long side) + (length of the short side))/4.

The polygon fitting algorithm effectively draws a line between the end points 1421 and 1429 and locates the points furthest above and below the line (points 1422 and 1426). If either extreme point lies beyond the allowed tolerance, it is incorporated into the polygon, thereby breaking the original line segment into subsegments. The algorithm continues, by recursively applying the same procedure to each subsegment until no raw data point lies further than the allowed tolerance form the nearest polygon segment. In the current example, both of the extreme points (1422 and 1426) are outside of the acceptable tolerance, so the original line segment is broken into three subsegments: 1421 to 427, 1422 to 1426, and 1426 to 1429. The algorithm continues by drawing the line segment between points 1421 and 1422. This line segment has no points more than the allowed tolerance level above or below it, so it is not subdivided further. The algorithm then draws the line between points 1422 and 1426 and locates points furthest above and below the line. In this case, point 1425 is determined to be furthest above tolerance and no points lie below. This creates two new subsegments, 1422 to 1425 and 1425 to 1526, which are refined recursively before the process examines the last subsegment that resulted from the first iteration of the process. The process eventually draws a line between point 1426 and 1429 and determines that point 1428 is furthest above the line and no points lie further than the tolerance value below it. The resulting subsegments are similarly refined by recursive application of the same procedure.

The process of iteratively creating subsegments by determining points that are maximally above and below the tolerance boundaries of existing segments continues until no raw data point lies more than the tolerance value from the nearest polygon segment of the profile 1420.

A second polygon is comprised of line segments connecting points fitted to a representation of a face profile of a character called a shaded profile. The shaded profile is derived from a profile of the face of the polygon by traversing the polygon from the bottom row to the top row and subtracting the minimum X value encountered in traversing the polygon from the current outside point on the polygon. The same procedure is then repeated from the top of the polygon to the bottom. The effect is that the remaining non-zero X points in the profile represent areas which effectively would be shaded if the character were imagined as being illuminated by lights on both sides. The shaded polygon is used in detecting and analyzing openings into the interior of a character.

A third polygon is comprised of points on a profile on a face of a character which is developed by subtracting the shaded profile from the original profile. This is termed the filled polygon. Both the shaded and filled polygons have the same number of points with the same y coordinates as the original polygon.

Finally, a fourth polygon is developed which has a looser fit than the original polygon to the original profile. This is done by developing a polygon from the original polygon having fewer points (i.e. utilizing a larger tolerance value).

Data is developed for both the horizontal and vertical windows which counts the number of phase changes from white to black in each row of the respective windows. For example, the character "I" in the horizontal window is generally comprised of rows having one horizontal phase change from white to black and the character "H" is generally comprised of rows having two phase changes from white to black. The phase change information is used to generate statistics used by the isit routines.

A first statistic is developed showing the percentage of rows in which a particular phase change value occurs. For example, for the character "I", the value one (representing the occurrence of one phase change from white to black in the row) may occur close to 100% of the time. For the character "H", the value one may occur 5% of the time and the value 2 may occur 85% of the time. For the character "d", in the horizontal window, there may be 0 phase change counts of the value 0 indicating that every row has at least one pixel on. There may be approximately 55% of the rows having one phase change, these rows comprising the upper half of the character "d". The remaining approximately 45% of the rows have two phase changes, these rows comprising the loop of the character "d". There are no rows having 3 or 4 phase changes.

In the preferred embodiment, rows with more than 4 phase changes are counted with rows that have exactly 4 phase changes for purposes of calculation of these percentage values. The limit of 4 phase changes is developed from experimental data and observations developed by the Applicant. Typically, occurrences of more than 4 phase changes represent noise in the bit-mapped image.

A second statistic is developed indicating where in the image of the character the average location of a particular phase change count occurs. For example, for the character "I" for a phase change count value of 1, the "where" value may be close to 50. This indicates the average location of a line with a phase change count of 1 occurs approximately at the middle of the character. For the character "d" the where value for the phase change count for the value of 1 may be approximately 20, indicating the average of the row numbers containing one phase change is approximately 20% of the way down the character. The where value for a phase change count of 2 may be approximately 75, indicating the average of the row numbers containing 2 phase changes is approximately three-quarters of the way down the character. This is because the loop on a lower case "d" is at the bottom half of the character.

An array is also developed for both the horizontal and vertical windows comprising an element for each row of the respective windows showing a count of the number of on pixels in that row. Polygons are also fitted to these arrays.

The isits are used to individually analyze the character, block 1304, until the character is recognized. A particular isit routine may utilize any one of a number of techniques for identifying whether a character is the character to be identified by the particular isit. In some cases, where a particular character's style varies significantly from type font to type font, a plurality of different techniques may be utilized to recognize the character. Typically, the isit routines analyze the shape of the faces of the character by utilizing the above described polygons and by utilizing the above described statistical information. The use of polygons to approximate characters tends to allow an isit routine to ignore small perturbations in the character.

A first technique utilized by isits to determine whether an image is the character to be identified by the particular isit is to examine the statistical information derived from the phase change data. For example, a particular isit may reject any character in which the percentage of rows having two changes from white to black exceeds 10%. An example of such an isit may be an isit for recognizing the character "I". In general, this method of examining statistical information allows most isits to eliminate 70 to 85% of all images input to them with a minimum of processing resources.

Another method of determining whether a particular character is a character to be recognized by a particular isit is to examine peaks in the polygons. For example, the letter upper case "F" is characterized by having two extreme peaks when examined from its right horizontal face. Isits may identify characters based on both the number of peaks and the relative position of such peaks. For example, an isit for recognizing the character "F" might reject the character "c" because the number and relative position of the peaks in one of its faces or in one of its population count arrays.

Certain characters are characterized by having a "spine" or "stroke" (i.e. the left face of a B, b, h, k, A, D, E, etc.). An isit for recognizing such characters may examine a character to find the longest single line segment in the character and look for characteristics such as the percentage of the length of the longest segment to the length of the character as a whole and the slope of the segment.

Another technique used by isits for identification of characters is to identify loops in the characters. A loop may be identified as a line having primarily two changes from white to black across each row of the loop. The isits identify the steepness of the curve of the loop, the relative symmetry of the curve and information about the corners of the loop. For example, the numeral "8" can often be distinguished from the letter "B" because of the difference in the corners.

As discussed above, after completing an analysis an isit returns either the ASCII code or the shape code for the particular image or information identifying the reason why the image was rejected. If the image is recognized, branch 1306, a template is built as described above in connection with template matching, block 1307. The identification code is then moved to the character galley.

Otherwise, the next isit is selected based on parameters such as the frequency of occurrence of the character represented by the isit and information obtained from prior isits showing reasons those isits rejected the character, branch 1310. If there are no more isits, branch 1311, the image in the character window is moved to the reject cache. Otherwise, branch 312, the next isit analyzes the character, block 1304.

SIDE MATCHING

In many cases, a character can not be recognized by either the template matching or feature analysis routines because the character is "stuck" to a character adjacent to it. This occurs, for example, when characters are spaced too closely together for the quality of the printing process. As one particular instance, such "stuck" together characters may occur when the ink bleeds in a document composed of proportionally spaced text.

The present invention discloses a method termed "side matching" for identifying such stuck characters. When analyzing a character window using side matching, templates are effectively laid on the sides of the character window to determine if a match would occur with that template if all pixels in the "shadow" of that template were ignored. The side matching methods of the present invention utilize the same template comparison algorithms as discussed above in reference to template matching but the side matching methods effectively ignore the images right or left sides.

For example, if a character window comprises the character "ite", all effectively stuck together, the side matching process attempts to lay templates on the left and right sides of the character window. Each of the templates would be aligned with the left side of the character window when looking for a match on the left and pixels to right of the on pixels in the template would be ignored. In the current example, laying a template for the character "i" on the left side of the character window could produce a match. If it did, the ASCII code for an "i" would be registered in the galley, and the side matching process would remove the pixels representing the character "i" from the window. The process would continue by attempting side matching on the remaining pixels in the window. In this case, a match might occur when using a template for the character "t".

The side matching method of the present invention may be applied from either the right or left side of a character window and is applied at all possible vertical registrations. If side matching from the left side of the character window leaves unrecognized characters, side matching is attempted from the right side.

Since some letter shapes are subsets of others (e.g., r-n-m or c-o-d), the templates are ranked and ordered by size prior to using the templates in side matching. Some templates (e.g., a period) are excluded from the side matching process because such templates would produces matches on virtually all images.

In the preferred embodiment, side matching is attempted on character windows in the reject cache after completion of processing of all characters in the document. This allows for a relatively large library of templates to be been created and increases chances for successful identification of characters with the side matching technique.

CONTEXT ANALYSIS

Figure 15:
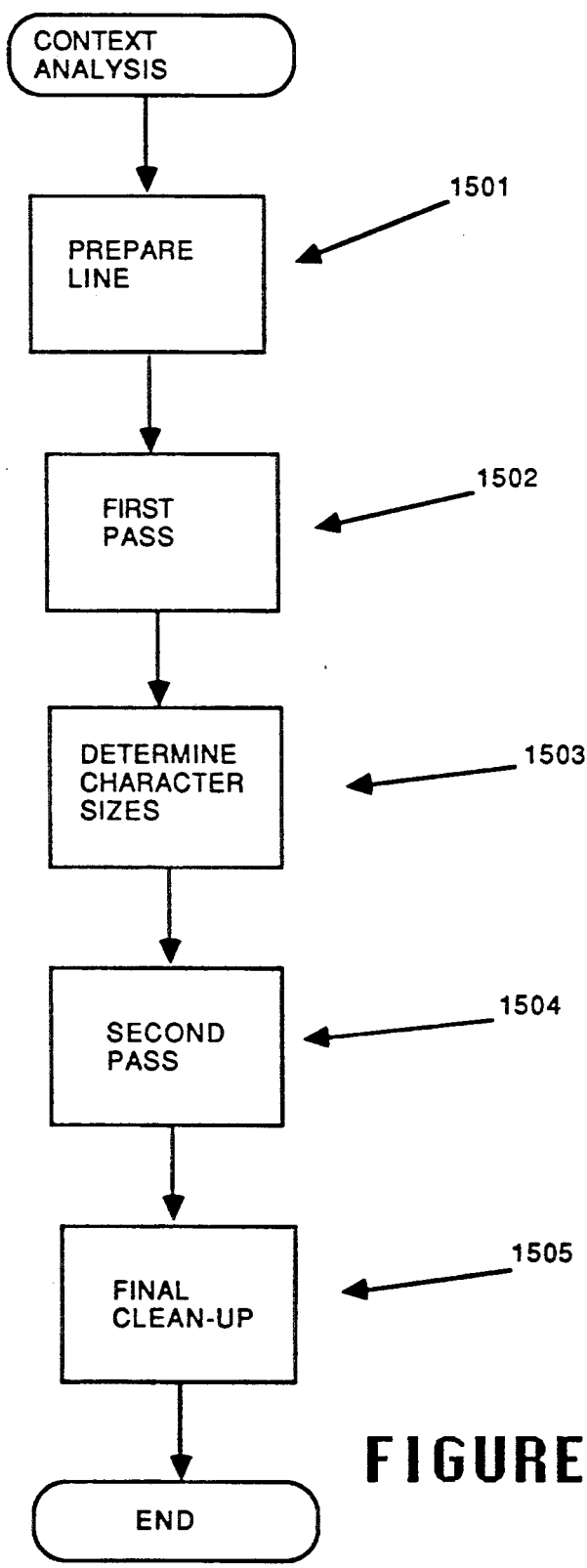
FIG. 15 is a flow diagram of a context analysis process as may be utilized by the present invention.

The character recognition process identifies characters by their shape. However the shape of the character alone may not be deterministic of what the character is. For example, a lower case "s" may not be distinguishable from an upper case "S". As another example, an apostrophe is not distinguishable from a comma based strictly on its shape. The context analysis routine accepts as input and utilizes as output the galley of character codes created by the character recognition routines. Context analysis is performed on one line of the page at a time to attempt to resolve ambiguities. Referring now to FIG. 15, the process utilized by the preferred embodiment of the present invention is illustrated.

The preferred embodiment of the present invention comprises a data base of characteristic attributes of various characters. These attributes may include information on whether the character is typically found entirely above the baseline of the character line or whether a tail or other portion of the character typically extends below the baseline. The data base also comprises information regarding the relative size of characters which are normally ambiguous when identified by shape alone. For example, the data base may comprises information for distinguishing between a upper case "S" and a lower case "s" based on the expected relative size.

Each line from the page is copied from the galley into a buffer to prepare the line for further processing, block 1501. During the process of copying a line to the buffer, values are assigned to characters from the character attribute data base such as information on whether the character sits above the baseline and whether the relative size of the character indicates whether it is upper or lower case. Spacing between words is also determined at this point by constructing and analyzing a histogram of the distances between letters. Importantly, as ambiguities are resolved for one character, the present invention utilizes information gained from resolving such ambiguities to assist in resolving ambiguities about neighboring characters.

The base line is also adjusted for skew. In the preferred embodiment, the skew may be adjusted by examining the expected baseline for each individual character and attempting to adjust the baseline for the entire line based on this information. If, however, the values for the baseline disagree significantly from character to character or from word to word, a character near each end of the line is found which is reliably known to sit on the baseline (e.g. the character "B" is known to sit on the baseline, the character "Q" can not be reliably predicted to sit exactly on the baseline because in some fonts its tail may extend below the baseline). An adjusted base line is then determined by effectively drawing a line connecting the bottom of these two characters near each end of the line.

The typical heights of upper and lower case letters in the line are determined by preparing histogram information showing the heights of non-ambiguous characters. Normally, such a histogram will show two levels of peaks, a first level corresponding to lower case characters and a second level corresponding to upper case characters.

Certain character types such as underlines are moved to the end of the buffer area. This allows these characters to be effectively ignored during the majority of the context analysis processing. Such characters are restored to their previous positions in the line near the completion of the character analysis processing.

Finally, a histogram type analysis of the width of white space between adjacent characters on the line is prepared. In the preferred embodiment, punctuation characters are not included in the histogram analysis unless the line consists entirely of punctuation lines. Typically, the histogram has two peak levels. The first peak level is assumed to represent character spacing between letters within words and the second peak level is assumed to represent spacing between words. If there not two distinct peak levels, words spacing is assumed to be some midpoint between peak levels. If there are not at least two peaks, an arbitrary word spacing point is determined based on the average height of characters in the line.

After preparing the line for context analysis, block 1501, a first pass is made through each character on the line, block 1502, to attempt to resolve ambiguities. This first pass looks at such characteristics as the relative height of characters in each word, the positions relative to the baseline, etc. For cases in which there is an ambiguity in determining whether a character is a numeral or a letter, the character is analyzed in relation to the other characters that neighbor it to determine whether they are numeric or alphabetic. Determining character ambiguities is an iterative process in which information which is known about neighboring characters is used in analyzing a particular character. After all characters in a word have been examined, consistency checks are performed. If one or more characters are found to have inconsistent characteristics, all characters in the word are flagged as being possibly wrongly interpreted. A second pass of the context analysis routine is intended to correct the interpretation.

After completing the first pass context analysis for each line in the galley, the context analysis routine attempts to assign a font identification number to each character in the galley and to determine character sizes for each font, block 1503. Font identification is propagated through the galley by tracing through all of the characters which were identified by templates. All of the characters that matched a particular template are linked together in a linked list having a root pointing to a particular template. Based on these linked lists of characters, words are assigned to fonts on the premise that words containing characters identified by the same template are of the same font. This is a lengthy, iterative process. Histogram information is then prepared detailing the height of the upper and lower case characters for each font.

A second pass is then made through each line in the galley, block 1504. Words which were flagged during the first pass as having inconsistencies are again analyzed to determine which characters are incorrect. The second pass checks such items as baseline uniformity, character size uniformity, alphabetic/numeric context, etc.

Finally, a series of miscellaneous clean-up routines are utilized, block 1505. Such things as punctuation are checked to ensure reasonable size and position. For example, a very large punctuation mark is probably an unrecognized character and is flagged as such. Periods and relatively wide commas or apostrophes which are located above the baseline or below the top of lower case character may be short dashes or bullets. These characters are assigned the ASCII code for a dash. When recognition is attempted on a bit-mapped image which is not printed text, such as a signature or a logo, the result is typically a string comprising unrecognized characters and a set of other characters such as punctuation and dashes. Such strings are collapsed into a single unrecognized character. Successive single quotes are combined into double quotation marks.

The context analysis routine also attempts to merge characters which may have been split by the character recognition routines. For example, two characters which may have been recognized by the character recognition routines as an open parenthesis "(" followed by a close parenthesis ")" may actually be the letter "o". The context analysis routines attempt to merge such split characters by recognizing the proximity of particular character pairs.

Other characters, such as underlines, are analyzed to determine whether they are within a predetermined distance from the baseline. If the underline is more than the predetermined distance or if its edges do not coincide with the word boundaries, it is considered to be a ruling rather than an underline. Otherwise, the characters above the underline are flagged as being underlined. The predetermined distance is determined based on the relative context of the line including such factors as the size of the characters.

The context analysis routines attempt to identify unidentified characters by merging together broken pieces of characters, resubmitting characters to the character recognition routines allowing less stringent constraints for the recognition, etc.

The output from the context analysis routines is the completed scanned page having ASCII character representations for characters on the page in the normal reading sequence of the characters.

Thus, an optical character recognition method and apparatus has been described.

We claim:

1. A method for performing optical character recognition of textual material on a medium, said medium having at least one array element, said method identifying said array element as consisting essentially of text or as comprising non-text, said identification of said array element as consisting essentially of text, comprising the steps of;
  (a) determining whether the number of on-bits in a first predetermined number of bytes of said array element is greater than or equal to a second predetermined number and less than or equal to a third predetermined number; and
  (b) determining whether the number of phase changes from on-bits to off-bits in said first predetermined number of bytes of said array element is greater than or equal to a fourth predetermined number and less than or equal to a fifth predetermined number.

2. The method as recited by claim 1, wherein said first predetermined number is four, said second predetermined number is 2, said third predetermined number is 12, said fourth predetermined number is 8 and said fifth predetermined number is 12.

3. A system for optically scanning a medium, said medium having thereon an unknown character, said system comprising:
  scanning means for scanning said medium, said scanning means providing as output a bit-mapped image of said medium;
  a first memory means coupled with said scanning means for storing said bit-mapped image;

a second memory means for storing a plurality of bit-mapped templates representing known characters;

processing means coupled with said first memory means and said second memory means, said processing means including means for parsing said bit-mapped image of said medium and providing as output a bit-mapped representation of said unknown character, means for generating polygon representations descriptive of the shape of said unknown character, means for generating statistical information concerning said polygon representations and means for analyzing said statistical information to identify said unknown character.

4. The system as recited in claim 3, wherein said processing means further includes means for identifying said unknown character by comparing said bit-mapped representation of said unknown character with each associated one of said plurality of templates of known characters.

5. The system as recited in claim 4, wherein said processing means further includes means for identifying said unknown character based on the surrounding context of said medium.

6. The system as recited in claim 5, wherein said system further comprises a third memory means for storing a recognized character.

7. The system as recited in claim 6, wherein said system is further comprised of a bus means for coupling said first memory means, said second memory means, said third memory means and said processing means.

8. The system as recited in claim 3, wherein said means for parsing said bit-mapped image of said medium and providing as output a bit-mapped representation of said medium further includes means for distinguishing material consisting essentially of text or as comprising non-text.

9. A method for performing optical character recognition of textual material on a medium, said medium having at least one array element, said method identifying said array element as consisting essentially of text or as comprising non-text, said identification of said array element as consisting essentially of text, comprising the steps of:
(a) determining whether the number of bits in a first state in a predetermined set of bits of said array element is within a first range of values; and
(b) determining whether the number of phase changes from said first state to a second state of said predetermined set of bits of said array element is within a second range of values.

10. The method as recited by claim 9, wherein said predetermined set of bits is a set of 32 bits, said first range of values is between 2 and 12 and said second range of values is between 8 and 12.

11. In an optical character recognition system, a method for identifying a bit-mapped image of an unknown character, comprising the steps of:
(a) generating polygon representations descriptive of the shape of said unknown character;
(b) generating statistical information from said polygon representations descriptive of the shape of said unknown character, and
(c) analyzing said statistical information to identify said unknown character.

12. In an optical character recognition system, a method for identifying a bit-mapped image of an unknown character, comprising the steps of:
(a) comparing said bit-mapped image of an unknown character with each of a plurality of templates in a template cache;
(b) determining if said bit-mapped image of an unknown character matches any of said plurality of templates in said template cache;
if said bit-mapped image of an unknown character does not match any of said plurality of templates in said template cache;
(c) generating polygon representations descriptive of the shape of said unknown character,
(d) generating statistical information from said polygon representations descriptive of the shape of said unknown character; and
(e) analyzing said statistical information to identify said unknown character.

13. The method as recited by claim 11, wherein said step of analyzing said statistical information to identify said unknown character comprises analyzing said statistical information with a plurality of separate processes, each of said plurality of separate processes for identifying a separate shape.

14. The method as recited by claim 12, wherein said step of analyzing said statistical information to identify said unknown character comprises analyzing said statistical information with a plurality of separate processes, each of said plurality of separate processes for identifying a separate shape.

15. A system for optically scanning a medium for determining if said medium is comprised essential of text of non-text, said medium having thereon an unknown character, said system comprising:
scanning means for scanning said medium, said scanning means providing as output a bit-mapped image of said medium;
a first memory means coupled with said scanning means for storing said bit-mapped image;
processing means for discriminating text from non-text coupled with said first memory means, said processing means including means for generating at least one array element from said bit mapped image, means for determining that the number of on-bits in a first predetermined number of bytes of said array element is greater than or equal to a second predetermined number and less than or equal to a third predetermined number and means for determining that the number of phase changes from on-bits to off-bits in said first predetermined number of bytes of said array element is greater than or equal to a fourth predetermined number and less than or equal to a fifth predetermined number.

* * * * *